(12) United States Patent
Hagihara

(10) Patent No.: US 8,749,680 B2
(45) Date of Patent: Jun. 10, 2014

(54) IMAGE PICKUP DEVICE

(75) Inventor: Yoshio Hagihara, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/357,031

(22) Filed: Jan. 24, 2012

(65) Prior Publication Data

US 2012/0194716 A1 Aug. 2, 2012

(30) Foreign Application Priority Data

Jan. 31, 2011 (JP) ................................ 2011-018200

(51) Int. Cl.
*H04N 5/335* (2011.01)
*H04N 3/14* (2006.01)
(52) U.S. Cl.
USPC ............................ 348/300; 348/301; 348/308
(58) Field of Classification Search
USPC .......... 341/120, 126, 155; 348/300, 301, 308, 348/241, 243, 222.1
See application file for complete search history.

(56) References Cited

U.S. PATENT DOCUMENTS

| | | | |
|---|---|---|---|
| 2003/0193595 A1* | 10/2003 | Henderson ..................... | 348/308 |
| 2006/0001564 A1* | 1/2006 | Yamagata et al. ............ | 341/169 |
| 2006/0012696 A1* | 1/2006 | Zarnowski et al. ........... | 348/294 |
| 2006/0049334 A1* | 3/2006 | Henderson et al. ......... | 250/208.1 |
| 2006/0284999 A1* | 12/2006 | Muramatsu et al. .......... | 348/308 |
| 2009/0231479 A1* | 9/2009 | Zarnowski et al. ........... | 348/302 |
| 2012/0162477 A1* | 6/2012 | Tanaka ..................... | 348/231.99 |
| 2012/0194716 A1* | 8/2012 | Hagihara ...................... | 348/300 |
| 2012/0327282 A1* | 12/2012 | Kudoh et al. ................. | 348/308 |

FOREIGN PATENT DOCUMENTS

JP 2006-340044 A 12/2006

* cited by examiner

*Primary Examiner* — Nhan T Tran
*Assistant Examiner* — Xi Wang
(74) *Attorney, Agent, or Firm* — Westerman, Hattori, Daniels & Adrian, LLP

(57) ABSTRACT

An image pickup device may include an image pickup unit in which unit pixels having photoelectric conversion elements are arranged, the unit pixels outputting pixel signals, a reference signal generation unit, a comparison unit that includes a differential amplifier unit and a reset unit, the differential amplifier unit comparing a voltage of the first input terminal to a voltage of the second input terminal, a measurement unit that measures a comparison time of the comparison unit from a comparison start to a comparison end, and a change unit that changes the voltage of the first input terminal so that a voltage difference between the first input terminal and the second input terminal is set to a voltage at which a comparison operation by the comparison unit is ensured after a reset operation by the reset unit.

2 Claims, 19 Drawing Sheets

IMAGE PICKUP DEVICE

BACKGROUND OF THE INVENTION

1. Field of the Invention

The present invention relates to an image pickup device.

Priority is claimed on Japanese Patent Application No. 2011-018200, filed Jan. 31, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

As an image pickup device using an analog-to-digital (AD) conversion method related to an example of the related art, a configuration disclosed in Japanese Unexamined Patent Application, First Publication No. 2006-340044 (hereinafter referred to as Patent Document 1) is known. First, a configuration and operation of the image pickup device disclosed in Patent Document 1 will be described.

FIG. 18 is a block diagram illustrating a schematic configuration of a (complementary) metal oxide semiconductor ((C)MOS) image pickup device using an AD conversion method disclosed in Patent Document 1. An image pickup device 1001 includes an image pickup unit 1002, a vertical selection unit 1012, a read current source unit 1005, an analog unit 1006, a column processing unit 1015, a reference signal generation unit 1016, a horizontal selection unit 1014, an output unit 1017, a change unit 1018, and a timing control unit 1020.

The timing control unit 1020 controls parts such as the vertical selection unit 1012, the read current source unit 1005, the analog unit 1006, the column processing unit 1015, the reference signal generation unit 1016, the horizontal selection unit 1014, and the output unit 1017. The image pickup unit 1002 includes unit pixels 1003 having photoelectric conversion elements arranged in a matrix, generates a pixel signal corresponding to the amount of an incident electromagnetic wave, and outputs the pixel signal to a vertical signal line 1013 provided in each column.

Upon driving of each unit pixel 1003 of the image pickup unit 1002, the vertical selection unit 1012 controls a row address or a row scan of the image pickup unit 1002 via a row control line 1011. The horizontal selection unit 1014 controls a column address or a column scan of a column AD conversion unit 1030 of the column processing unit 1015. The read current source unit 1005 is a current source for reading the pixel signal from the image pickup unit 1002 as a voltage signal. The analog unit 1006 executes amplification or the like, if necessary.

The column processing unit 1015 has the change unit 1018 and the column AD conversion unit 1030 provided in each column of the image pickup unit 1002. The change unit 1018 is turned on (activated), and hence is short-circuited to a voltage source, which supplies a predetermined voltage. The column AD conversion unit 1030 converts an analog signal, which is a pixel signal output from each unit pixel 1003 of the image pickup unit 1002 in each column, into digital data, thereby outputting the digital data. The reference signal generation unit 1016 includes, for example, an integral circuit or a digital-to-analog conversion (DAC) circuit, and generates a reference signal Ramp, which varies in an inclined shape according to the passage of time.

Next, a configuration of the column AD conversion unit 1030 will be described. FIG. 19 is a block diagram illustrating a configuration of the column processing unit 1015 including the column AD conversion units 1030. The column AD conversion units 1030 all have the same configuration, and each column AD conversion unit 1030 is configured to have a comparison unit 1031 and a measurement unit 1032.

The comparison unit 1031 is a comparator circuit having a differential amplifier which is generally well-known as a basic configuration. The comparison unit 1031 compares a pixel signal output from the unit pixel 1003 of the image pickup unit 1002 to the reference signal Ramp, outputs a high (H) level, for example, when the reference signal Ramp is larger than the pixel signal, and outputs a low (L) level, for example, when the reference signal Ramp is smaller than the pixel signal.

The measurement unit 1032 includes an up/down-counter circuit, and measures a comparison time of the comparison unit 1031 from a comparison start to a comparison end. Thereby, a measurement value of the comparison time corresponding to the amount of a pixel signal can be obtained. The horizontal selection unit 1014 includes a shift register, a decoder, or the like, and controls a column address or a column scan of each column AD conversion unit 1030 in the column processing unit 1015. Thereby, AD-converted digital data is output to the output unit 1017 by way of a horizontal signal line.

A comparison operation by the comparison unit 1031 is initiated after voltages of two input terminals of the differential amplifier constituting the comparison unit 1031 are reset (balanced). The change unit 1018 is provided in the image pickup device 1001 to prevent a defect in which an output of the comparison unit 1031 is not inverted, or the output of the comparison unit 1031 is inverted immediately after an input of the reference signal Ramp, by slight variation remaining in the voltages of the two input terminals of the differential amplifier constituting the comparison unit 1031 after the reset operation.

Next, an AD conversion operation will be described. Description of a specific operation of the unit pixel 1003 is omitted, but a reset level and a signal level are output as pixel signals from the unit pixel 1003.

First, the voltages of the two input terminals of the differential amplifier constituting the comparison unit 1031 are reset (balanced) once reading of the reset level from the unit pixel 1003 is stable. Subsequently, the change unit 1018 applies a predetermined voltage to an input terminal to which the reference signal Ramp has been given. Thereafter, the comparison unit 1031 compares the reference signal Ramp to the pixel signal using the predetermined voltage as a voltage of a comparison start. The measurement unit 1032 performs measurement in a count-down mode, and a measurement value of a comparison end time becomes digital data at the reset level.

Subsequently, when the signal level from the unit pixel 1003 is read, the reset operation in the comparison unit 1031 and the change operation by the change unit 1018 are not performed. Once the reading of the signal level from the unit pixel 1003 is stable, the comparison unit 1031 compares the reference signal Ramp to the pixel signal using the predetermined voltage as the voltage of the comparison start. The measurement unit 1032 performs measurement in a count-up mode, and a measurement value of the measurement unit 1032 of the comparison end time becomes a digital data of a signal component (a signal obtained by subtracting the reset level from the signal level).

As described above, it is possible to AD-convert the pixel signal. In addition, even when slight variation remains in the voltages of the two input terminals of the differential amplifier constituting the comparison unit 1031 after the reset operation, the change unit 1018 applies the predetermined voltage to the input terminal to which the reference signal Ramp has been given, so that the output of the comparison unit 1031 can be reliably inverted during the comparison operation because the voltage of the input terminal to which the reference signal Ramp has been given is higher than the voltage of the input terminal to which the pixel signal has been given.

In the image pickup device disclosed in Patent Document 1, the voltage of the input terminal to which the reference signal Ramp has been given is changed, but an operation of changing the voltage of the input terminal to which the pixel signal has been given is not disclosed.

(1) Configuration of Change Unit

It is preferable to use an n-channel MOS (NMOS) transistor (hereinafter referred to as NMOS) for the input terminal of the differential amplifier constituting the comparison unit for the speed-up of the comparison unit and use NMOS as a switch element constituting the change unit for the speed-up of the change unit. When the comparison unit and the change unit using these configurations are applied to a general image pickup device, it is necessary to increase and change a voltage of an input terminal by providing a predetermined voltage to the input terminal to which the reference signal is given between the two input terminals of the differential amplifier after the reset operation so as to reliably perform the comparison operation. However, the voltage of the input terminal may not be changed because NMOS constituting the change unit is not turned on (activated) by the predetermined voltage given to the input terminal, or the change may be time-consuming because a resistance component is large even when NMOS is turned on. Although the change unit may also be constituted by NMOS having a small threshold, an additional step of a semiconductor process that is cost-ineffective is necessary.

(2) Configuration of Directly Changing Voltages of Input Terminals of Differential Amplifier In order to solve the problem occurring in (1), the change unit may be constituted by a p-channel MOS (PMOS) transistor (hereinafter referred to as PMOS). It is possible to sacrifice small size to implement the speed-up of the change unit by increasing a size of PMOS. However, when the voltages of the input terminals of the differential amplifier are directly changed, the following problem occurs. The voltages of the two input terminals of the differential amplifier after the reset are not completely the same as a reset voltage VRST, and include reset variation ΔVRST due to a threshold of the transistor or the like. In general, variations of manufacturing conditions between adjacent columns of the image pickup device are substantially the same. However, the variations of the manufacturing conditions may be increased between all columns of the image pickup device and the reset variation ΔVRST may be about 100 mV. That is, when the voltages of the input terminals of the differential amplifier are directly changed differently from when the voltages of the input terminals of the differential amplifier is changed via a capacitive element or the like, it is necessary to make a change to a voltage including the reset variation ΔVRST. Because an additional comparison time for the reset variation ΔVRST between all the columns of the image pickup device is necessary, the comparison time is lengthened and the speed-up of AD conversion is difficult.

(3) Configuration of Reference Signal Generation Unit

The voltage of the input terminal to which the reference signal is given may be changed by controlling the reference signal. In this case, although the problems occurring in (1) and (2) can be suppressed, a voltage change function needs to be embedded in the reference signal generation unit and the configuration or its control becomes complex.

SUMMARY

The present invention provides an image pickup device capable of reliably performing a comparison operation between a reference signal and a pixel signal using a novel method.

An image pickup device may include: an image pickup unit in which unit pixels having photoelectric conversion elements are arranged, the unit pixels outputting pixel signals; a reference signal generation unit that generates a reference signal, the reference signal being increased or decreased with a passage of time; a comparison unit that includes a differential amplifier unit and a reset unit, the differential amplifier unit having a first input terminal and a second input terminal, the first input terminal being electrically connected to the unit pixel via a first capacitive element, the second input terminal being electrically connected to the reference signal generation unit, the differential amplifier unit comparing a voltage of the first input terminal to a voltage of the second input terminal, the reset unit resetting the voltages of the first and second input terminals; a measurement unit that measures a comparison time of the comparison unit from a comparison start to a comparison end; and a change unit that changes the voltage of the first input terminal so that a voltage difference between the first input terminal and the second input terminal is set to a voltage at which a comparison operation by the comparison unit is ensured after a reset operation by the reset unit.

The change unit may include a second capacitive element and a second switch element. One end of the second capacitive element may be connected to the first input terminal. The other end of the second capacitive element may be connected to a first voltage source by the second switch element during the reset operation by the reset unit, and connected to a second voltage source different from the first voltage source after the reset operation by the reset unit.

The first voltage source may be a power supply or a ground, and the second voltage source may be the pixel signal.

The change unit may include a first switch element. One end of the first switch element may be connected to the first input terminal. The other end of the first switch element may be connected to a voltage source that applies a voltage to the first input terminal so that the voltage difference between the first input terminal and the second input terminal is set to the voltage at which the comparison operation by the comparison unit is ensured. The first switch element may be in an OFF state before the reset operation by the reset unit. The first switch element may be in an ON state after the reset operation by the reset unit.

According to the present invention, it is possible to reliably perform a comparison operation between a reference signal and a pixel signal by changing a voltage of a first input terminal so that a voltage difference between the first input terminal electrically connected to a unit pixel via a first capacitive element and a second input terminal electrically connected to a reference signal generation unit is set to a voltage at which the comparison operation by a comparison unit is ensured after a reset operation by a reset unit.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

First Preferred Embodiment

Figure 1:
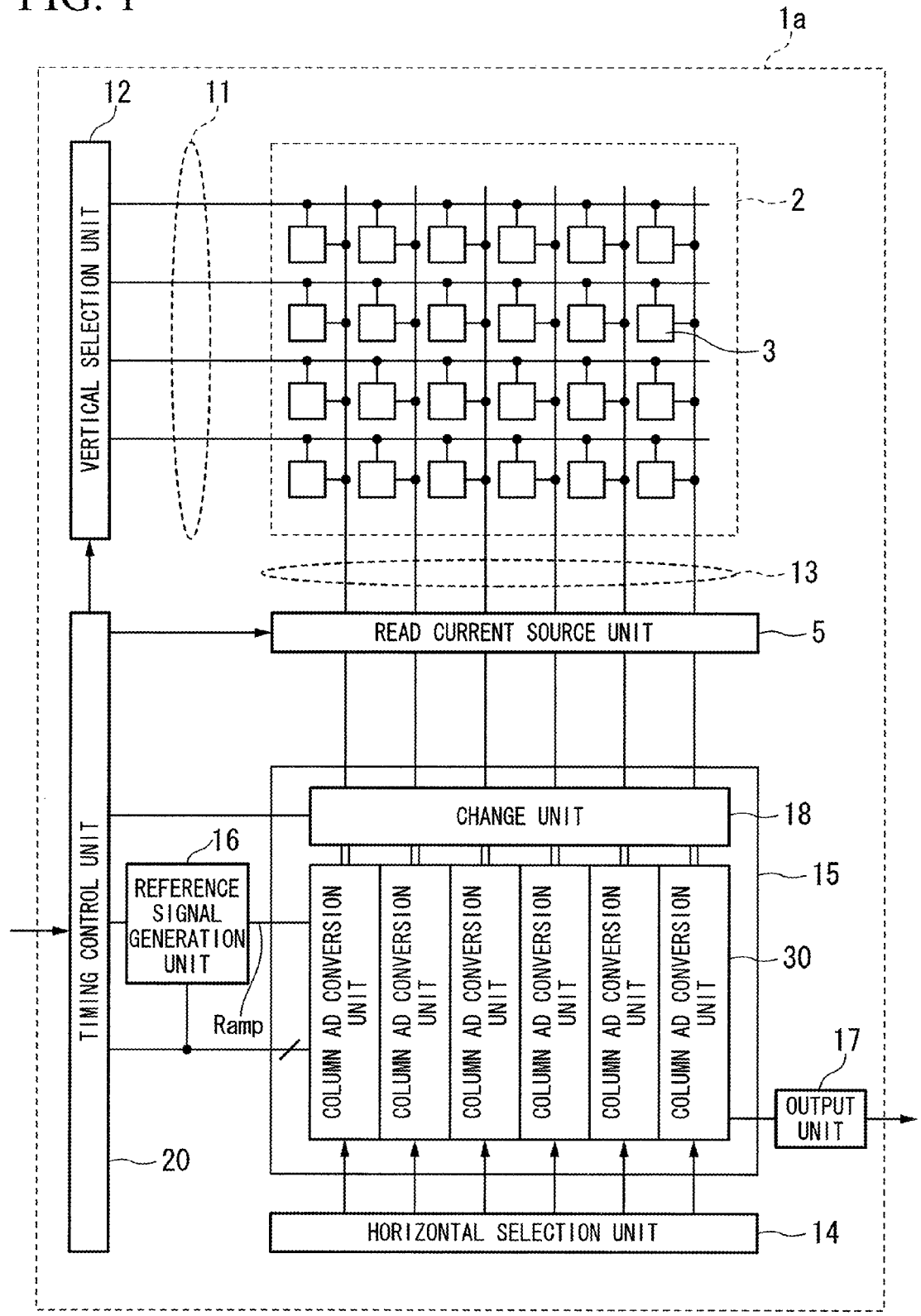
FIG. 1 is a block diagram illustrating a configuration of an image pickup device in accordance with a first preferred embodiment of the present invention.

First, a first preferred embodiment of the present invention will be described. FIG. 1 is a block diagram illustrating an example of a configuration of a (C)MOS image pickup device in accordance with the first preferred embodiment of the present invention. An image pickup device 1a shown in FIG. 1 includes an image pickup unit 2, a vertical selection unit 12, a read current source unit 5, a column processing unit 15, a reference signal generation unit 16, a change unit 18, a horizontal selection unit 14, an output unit 17, and a timing control unit 20.

The image pickup unit 2 has a plurality of unit pixels 3 arranged in a matrix to generate and output pixel signals corresponding to the amounts of incident electromagnetic waves. The vertical selection unit 12 selects each row of the image pickup unit 2. The read current source unit 5 reads a signal from the image pickup unit 2 as a voltage signal. The reference signal generation unit 16 generates a reference signal Ramp (ramp wave), which increases or decreases with the passage of time. The column processing unit 15 is connected to the reference signal generation unit 16. The horizontal selection unit 14 reads data after AD conversion to a horizontal signal line. The output unit 17 outputs the digital data read by the horizontal selection unit 14 to a subsequent-stage circuit. The timing control unit 20 controls each part.

Although the image pickup unit 2 including unit pixels 3 of 4 rows×6 columns is illustrated for simplicity in FIG. 1, several tens or several tens of thousands of unit pixels 3 are actually arranged in each row or column of the image pickup unit 2. Although not shown, the unit pixel 3 constituting the image pickup unit 2 includes a photoelectric conversion element such as a photodiode/photo gate/photo transistor and a transistor circuit.

Hereinafter, each part will be described in further detail. In the image pickup unit 2, the unit pixels 3 of 4 rows and 6 columns are two-dimensionally arranged and a row control line 11 is wired for every row in a pixel array of the 4 rows and the 6 columns. One end of the row control line 11 is connected to each output terminal corresponding to each row of the vertical selection unit 12. The vertical selection unit 12 includes a shift register, a decoder, or the like, and controls a row address or a row scan of the image pickup unit 2 via the row control line 11 when each unit pixel 3 of the image pickup unit 2 is driven. In addition, a vertical signal line 13 is wired for every column in the pixel array of the image pickup unit 2.

The read current source unit 5 includes a current source for reading a pixel signal from the image pickup unit 2 as a voltage signal.

The column processing unit 15 has the change unit 18 and a column AD conversion unit 30 provided for every pixel column of the image pickup unit 2, that is, for every vertical signal line 13. The column AD conversion unit 30 has a comparison unit 31 and a measurement unit 32. The column AD conversion unit 30 converts an analog pixel signal read through the vertical signal line 13 for every pixel column from each unit pixel 3 of the image pickup unit 2 into digital data.

The change unit 18 includes NMOS. A source of NMOS is connected to a first input terminal of the comparison unit 31 of the column AD conversion unit 30 (FIG. 2), a drain of NMOS is connected to a voltage source to which a predetermined voltage is given, and a gate is turned on (activated), so that NMOS is short-circuited.

Although the column AD conversion unit 30 is configured to be arranged for a pixel column of the image pickup unit 2 in one-to-one correspondence in the first preferred embodiment of the present invention, this is only exemplary and the present invention is not limited to the above-described layout relationship. For example, one column AD conversion unit 30 may be arranged for a plurality of pixel columns, and the one column AD conversion unit 30 may be configured to be used by time division between the plurality of pixel columns. The column processing unit 15 constitutes an analog-to-digital converter (ADC) circuit, which converts an analog pixel signal read from the unit pixel 3 of a selected pixel row of the image pickup unit 2 into digital pixel data, along with the reference signal generation unit 16 to be described later. Details of the column AD conversion unit 30 will be described later.

The reference signal generation unit 16 includes, for example, an integral circuit, and its level increases or decreases in an inclined shape with the passage of time according to control by the control unit 20. The reference signal generation unit 16 generates a ramp wave and supplies the ramp wave as a reference signal Ramp to a second input terminal of the comparison unit 31 (FIG. 2) of the column AD conversion unit 30 via a reference signal line. A digital-to-analog converter (DAC) circuit may be used as well as the integral circuit as the reference signal generation unit 16. When a digital ramp wave is configured to be generated using the DAC circuit, it is necessary to finely form the step of the ramp wave or take a configuration equivalent thereto.

The horizontal selection unit 14 includes a shift register, a decoder, or the like, and controls a column address or a column scan of the column AD conversion unit 30 of the column processing unit 15. According to control by the horizontal selection unit 14, digital data after AD conversion by the column AD conversion unit 30 is read to the output unit 17 via the horizontal signal line in order.

The timing control unit 20 includes a functional block of a timing generator (TG), which supplies a clock or a pulse signal of a predetermined timing necessary for an operation of each part such as the vertical selection unit 12, the read current source unit 5, the reference signal generation unit 16, the column processing unit 15, the horizontal selection unit 14, or the output unit 17, and a functional block for communicating with the TG.

In the output unit 17, signal processing functions, for example, black level adjustment, column variation correction, color processing, and the like, may be embedded in addition to a buffering function. Furthermore, n-bit parallel digital data may be converted into serial data to be output.

Figure 2:
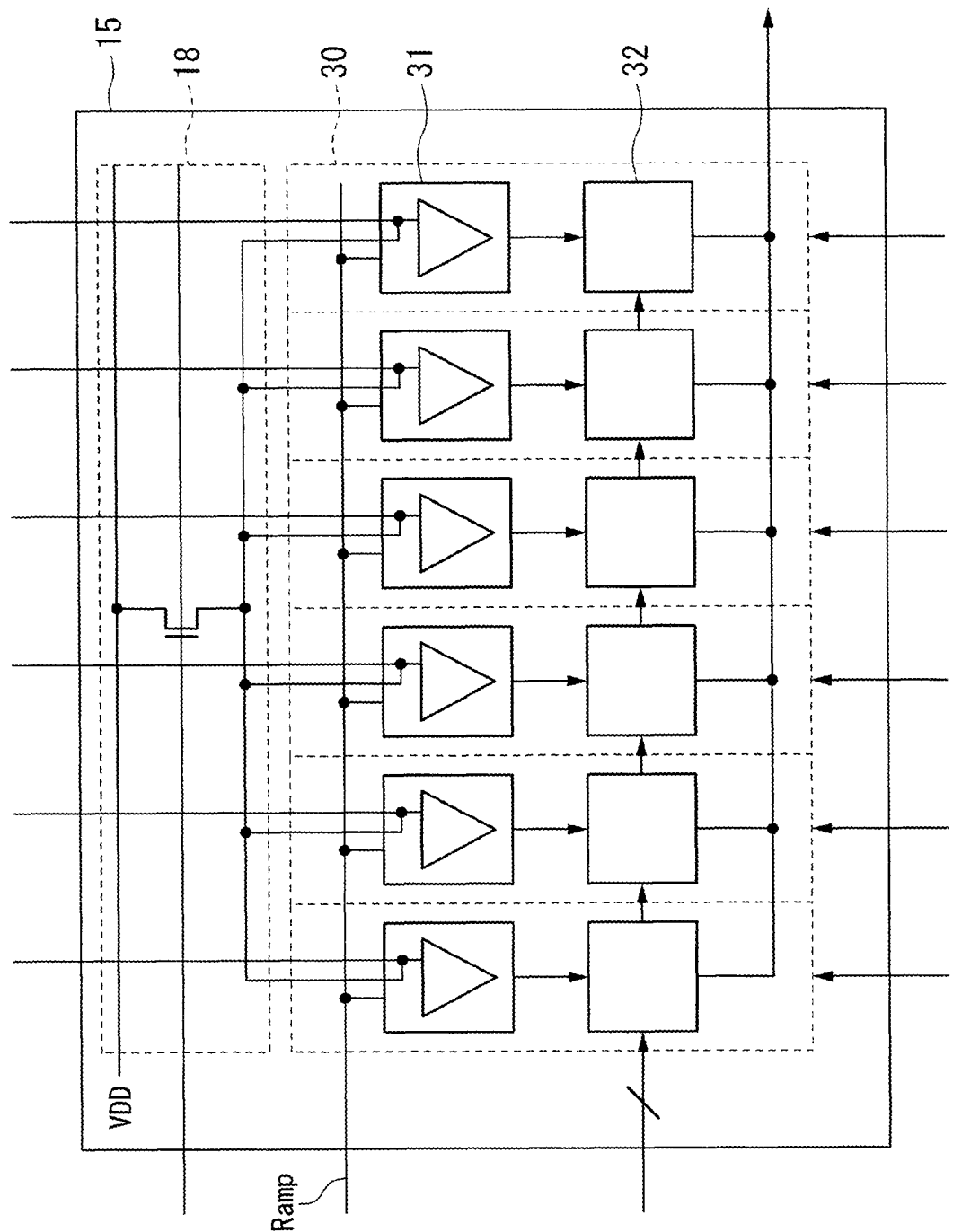
FIG. 2 is a block diagram illustrating a configuration of a column processing unit included the image pickup device in accordance with the first preferred embodiment of the present invention.
Figure 6:
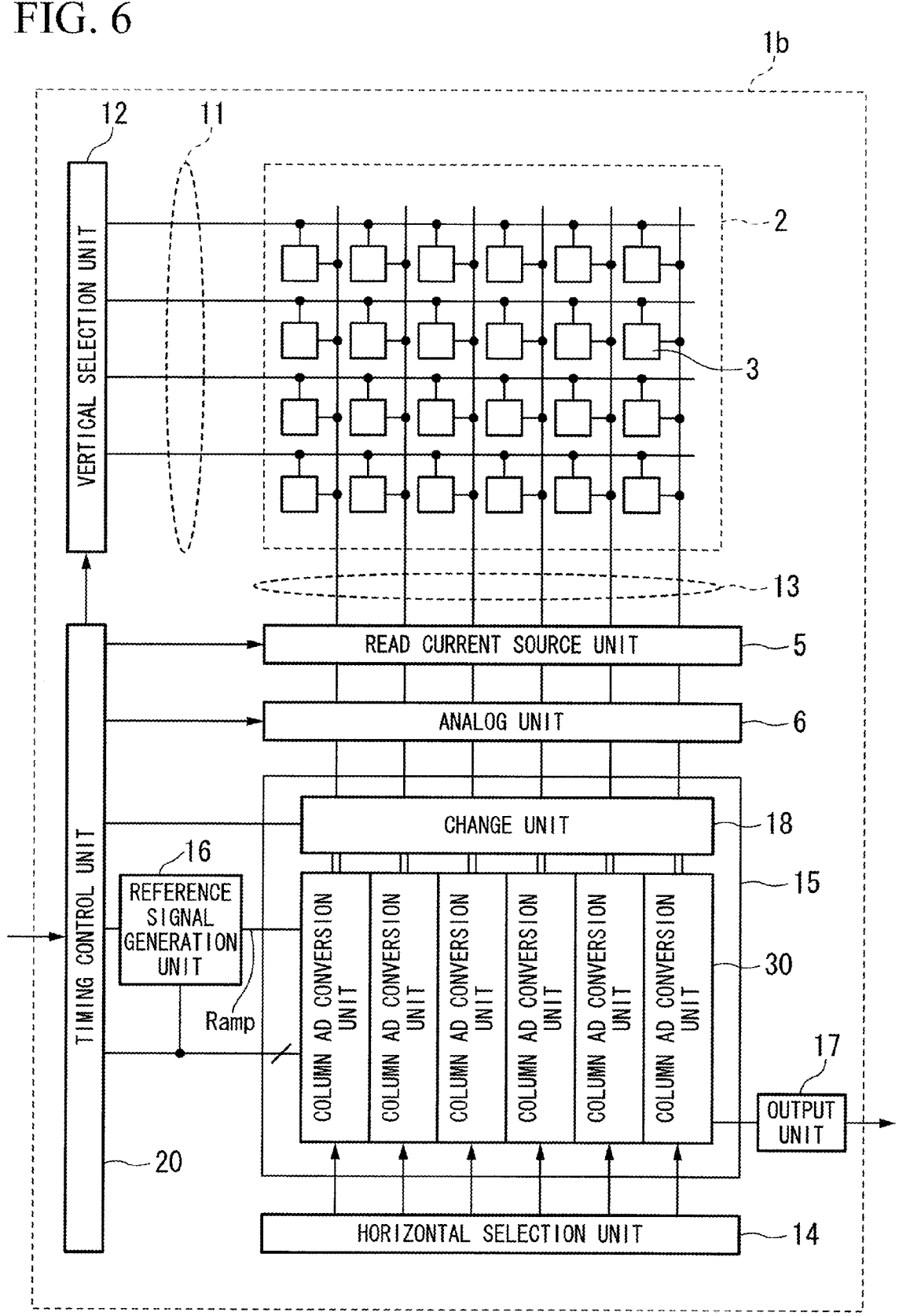
FIG. 6 is a block diagram illustrating a configuration of an image pickup device in accordance with a third preferred embodiment of the present invention.

Next, a configuration of the column AD conversion unit 30 will be described. FIG. 2 is a block diagram illustrating an example of a configuration of the column processing unit 15 including the column AD conversion unit 30. The column AD conversion unit 30 is provided for every column. In FIGS. 1 and 2, 6 column AD conversion units 30 are provided. The column AD conversion units 30 have the same configuration. The column AD conversion unit 30 generates a pulse signal having a magnitude (pulse width) of a time-axis direction corresponding to each magnitude of a reset level or a signal level by comparing an analog pixel signal read from each unit pixel 3 of the image pickup unit 2 through the vertical signal line 13 to a reference signal Ramp given from the reference signal generation unit 16. AD conversion is performed by converting data corresponding to a period of the pulse width of the pulse signal into digital data corresponding to the amount of the pixel signal.

Hereinafter, details of a configuration of the column AD conversion unit 30 will be described. The column AD conversion unit 30 includes the comparison unit 31 and the measurement unit 32.

The comparison unit 31 converts the amount of a pixel signal into information of a time-axis direction (or a pulse width of a pulse signal) by comparing a signal voltage corresponding to an analog pixel signal output from the unit pixel 3 of the image pickup unit 2 through the vertical signal line 13 to the reference signal Ramp supplied from the reference signal generation unit 16. For example, a comparison output of the comparison unit 31 has an H level when a ramp voltage of the reference signal Ramp is greater than the signal voltage, and has an L level when the ramp voltage is equal to or less than the signal voltage.

The measurement unit 32 includes, for example, an n-bit up/down-counter circuit, so as to measure a comparison time of the comparison unit 31 from a comparison start to a comparison end. For example, n bits are 10 bits. In addition, it is one example that n bits are 10 bits and. "n" may be a number of bits less than 10 (for example, 8) or a number of bits greater than 10 (for example, 12).

Next, an operation of the first preferred embodiment of the present invention will be described. Here, although the description of a specific operation of the unit pixel 3 is omitted, a reset level and a signal level are output by the unit pixel 3 as is well known.

The AD conversion is performed as follows. For example, a ramp wave (reference signal Ramp) falling at a predetermined tilt is compared to a voltage of a reset level or a signal level as a pixel signal from the unit pixel 3. A period until a signal corresponding to the reset level or the signal level is the same as the ramp wave (ramp voltage) from a point in time when a ramp wave for use in comparison processing has been generated is measured, for example, according to a reference clock, so that digital data corresponding to a magnitude of the reset level or the signal level is obtained.

Here, a reset level including noise of a pixel signal in a first read operation is read as an analog pixel signal from each unit pixel 3 of a selected row of the image pickup unit 2, and then a signal level is read in a second read operation. The reset level and the signal level are input to the column AD conversion unit 30 through the vertical signal line 13 in time series.

First Read

Once the first read, from the unit pixel 3 of an arbitrary pixel row to the vertical signal line 13 is stable, a reset operation of the comparison unit 31 is performed. Subsequently, the change unit 18 changes a voltage of the first input terminal of the comparison unit 31 to which the reset level has been given to a predetermined voltage lower than the reset level.

Thereafter, the timing control unit 20 supplies control data of ramp wave generation to the reference signal generation unit 16. Upon receipt of the control data, the reference signal generation unit 16 outputs a ramp wave (reference signal Ramp) of which waveform varies with time in a ramp shape as a whole as a comparison voltage given to the second input terminal of the comparison unit 31. The comparison unit 31 compares the voltage of the second input terminal to which the ramp wave has been given from the reference signal generation unit 16 to the voltage of the first input terminal to which the reset level has been given, and inverts a comparison output when the two voltages are substantially the same.

The measurement unit 32 starts measurement in the countdown mode based on the comparison start by the comparison unit 31, and retains a measurement value when the comparison output of the comparison unit 31 has been inverted. That is, the measurement unit 32 retains digital data corresponding to the reset level. The timing control unit 20 stops the supply of control data to the reference signal generation unit 16 and an output of the reference clock when a predetermined period has elapsed. Thereby, the reference signal generation unit 16 stops the ramp wave generation.

Second Read

Subsequently, during the second read, a signal level corresponding to an amount of incident light of each unit pixel 3 is read. During the second read, the reset operation of the comparison unit 31 and the change operation by the change unit 18 are not performed.

Once the second read from the unit pixel 3 of the arbitrary pixel row to the vertical signal line 13 is stable, the timing control unit 20 supplies control data of ramp wave generation to the reference signal generation unit 16. Upon receipt of the control data, the reference signal generation unit 16 outputs a ramp wave (reference signal Ramp). The comparison unit 31 compares the voltage of the second input terminal to which the ramp wave has been given from the reference signal generation unit 16 to the voltage of the first input terminal to which the signal level has been given, and inverts a comparison output when the two voltages are substantially the same.

The measurement unit 32 starts measurement in the count-up mode based on the comparison start by the comparison unit 31, and retains a measurement value when the comparison output of the comparison unit 31 has been inverted. That is, the measurement unit 32 retains digital data corresponding to a signal component obtained by subtracting the reset level from the signal level (correlated double sampling (CDS) processing). The timing control unit 20 stops a supply of control data to the reference signal generation unit 16 and an output of the reference clock when a predetermined period has elapsed. Thereby, the reference signal generation unit 16 stops the ramp wave generation.

Figure 3:
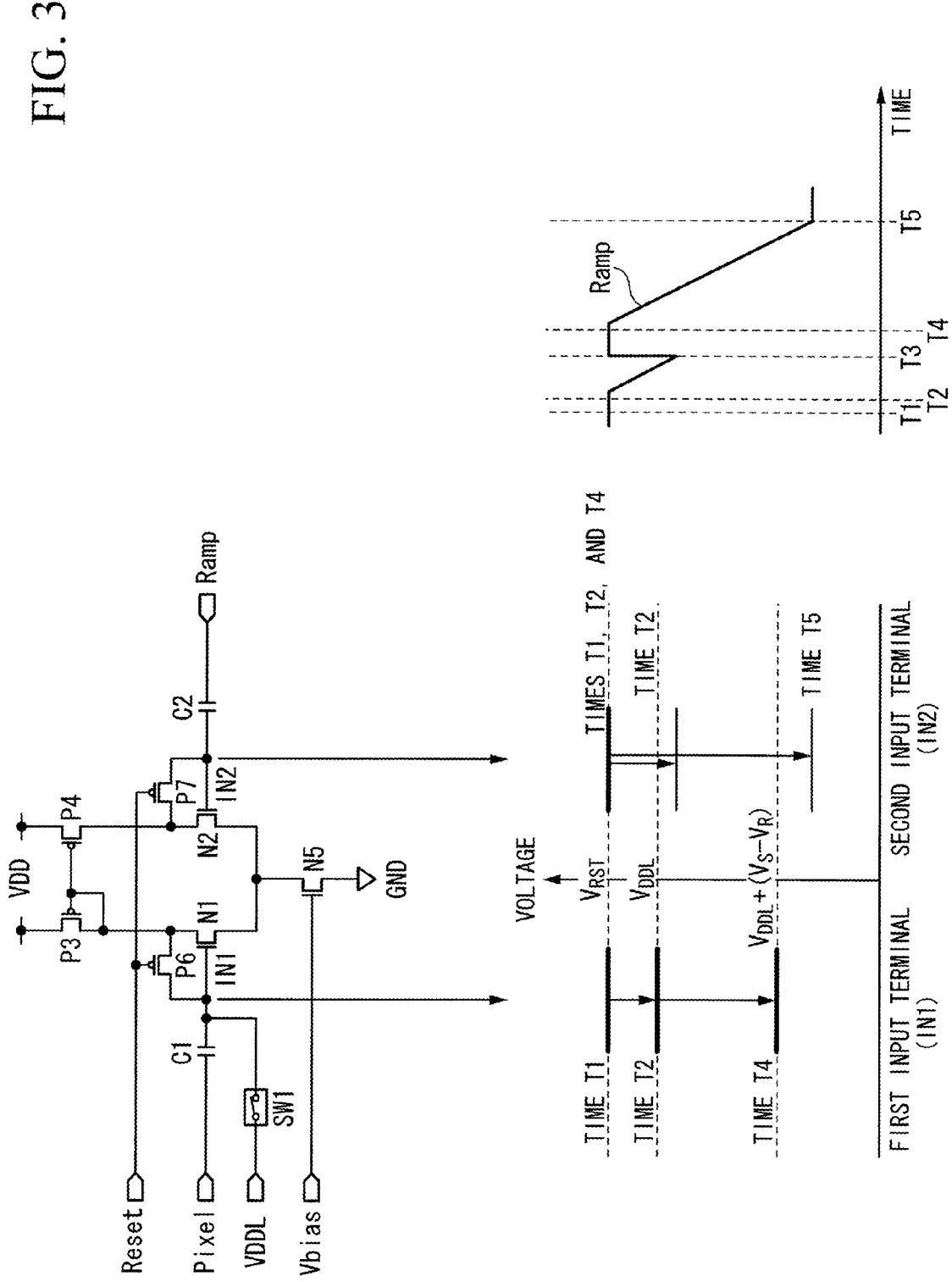
FIG. 3 is a diagram illustrating specific circuit configurations of a comparison unit and a change unit and voltage variations in input terminals of the comparison unit included the image pickup device in accordance with the first preferred embodiment of the present invention.

Next, details of configurations of the comparison unit 31 and the change unit 18 and voltage variations in the input terminals of the comparison unit 31 will be described. FIG. 3 is a diagram illustrating an example of specific circuit configurations of the comparison unit 31 and the change unit 18 and the voltage variations in the input terminals of the comparison unit. Hereinafter, a circuit configuration of the first preferred embodiment of the present invention will be described.

In FIG. 3, the differential amplifier within the comparison unit 31 includes transistors N1 and N2 including NMOSs of which sources are commonly connected, transistors P3 and P4 including PMOSs connected between drains of the transistors N1 and N2 and a power supply VDD and of which gates are commonly connected, and a current source N5 of NMOS connected between a node commonly connected to sources of the transistors N1 and N2 and a ground GND.

In the differential amplifier, transistors P6 and P7 include PMOSs each connected between gates and drains of the transistors N1 and N2. The transistors P6 and P7 are in an ON state when a low-active reset pulse Reset is given from the timing control unit 20 to each gate, and short-circuit the gates and the drains of the transistors N1 and N2, and function as reset units that reset voltages of the gates of the transistors N1 and N2, that is, voltages of two input terminals IN1 and IN2 of the differential amplifier.

The gates of the transistors N1 and N2 are each connected to one ends of capacitive elements C1 and C2 for cutting a DC level. A pixel signal Pixel output from each unit pixel 3 of the image pickup unit 2 is given to the other end of the capacitive element C1. A reference signal Ramp from the reference signal generation unit 16 is given to the other end of the capacitive element C2.

In all columns, a common switch element SW1 (a first switch element) constitutes the change unit 18. One end of the switch element SW1 is connected to the gate of the transistor N1, and the other end of the switch element SW1 is connected, for example, to a voltage source VDDL. A voltage $V_{DDL}$ supplied by the voltage source VDDL is pre-adjusted to a voltage lower than the reset level. The switch element SW1 includes, for example, NMOS, and its ON and OFF states are controlled by a control signal (not shown) from the timing control unit 20.

In addition, a bias voltage Vbias for controlling a current value is given to a gate of a current source N5.

Hereinafter, an operation of the first preferred embodiment of the present invention will be described. Here, a reset-level voltage is $V_R$, a signal-level voltage is $V_S$ ($V_S \le V_R$), and a voltage of the voltage source VDDL is $V_{DDL}$. In FIG. 3, voltage variations of the first input terminal IN1 and the second input terminal IN2 of the differential amplifier within the comparison unit 31 and a waveform of the reference signal Ramp are shown.

Once the reset level is given to the first input terminal IN1 as the pixel signal Pixel from the unit pixel 3 and the reference signal Ramp given from the reference signal generation unit 16 to the second input terminal IN2 is stable, the timing control unit 20 activates a reset pulse Reset (low active) before the comparison start of the comparison unit 31. Thereby, the transistors P6 and P7 are in the ON state, the gates and the drains of the transistors N1 and N2 are short-circuited, and the voltages of the two input terminals are reset by designating operation points of the transistors N1 and N2 as drain voltages.

At the operation points determined by the reset, offset components of the voltages of the two input terminals of the differential amplifier, that is, the gate voltages of the transistors N1 and N2, are almost canceled. That is, the voltages of the two input terminals of the differential amplifier are reset to be substantially the same voltage $V_{RST}$. At this time (time T1), the voltage of the first input terminal IN1 is $V_{RST}$ and the voltage of the second input terminal IN2 is $V_{RST}$.

After the reset, the transistors P6 and P7 are in the OFF state.

Subsequently, the switch element SW1 is switched from the OFF state to the ON state, so that the voltage of the first input terminal IN1 to which the pixel signal Pixel is given, that is, the gate voltage of the transistor N1, is reduced and changed from the voltage $V_{RST}$ to a predetermined voltage $V_{DDL}$ ($V_{DDL} < V_{RST}$). At this time (time T2), the voltage of the first input terminal IN1 is $V_{DDL}$ and the voltage of the second input terminal IN2 is $V_{RST}$. The switch element SW1 is in the OFF state after the ON state.

Because $V_{DDL} < V_{RST}$, the voltage of the first input terminal IN1 at the initiation of comparison of the comparison unit 31 related to the first read is lower than the voltage of the second input terminal IN2 to which the reference signal Ramp is given. That is, even when slight variation remains in the voltages of the two input terminals of the differential amplifier constituting the comparison unit 31 after the reset operation of the comparison unit 31, the change unit 18 changes the voltage of the first input terminal of the comparison unit 31 to which the reset level has been given to a lower voltage, so that the voltage of the second input terminal to which the ramp wave has been given is higher than the voltage of the first input terminal to which the reset level has been given. As shown in FIG. 3, the ramp wave, which decreases with the passage of time, is given as the reference signal Ramp, so that the output of the comparison unit 31 can be reliably inverted during the comparison operation and the comparison operation by the comparison unit 31 can be ensured.

After time T2, the ramp wave is given as the reference signal Ramp to the second input terminal. At the timing when the voltage of the second input terminal to which the ramp wave has been given and the reset voltage of the first input terminal are substantially the same, the comparison output of the comparison unit 31 is inverted. At a time (time T3) when a predetermined time has elapsed after the input of the ramp wave to the second input terminal has been initiated, the reference signal generation unit 16 stops the ramp wave generation.

Figure 4:
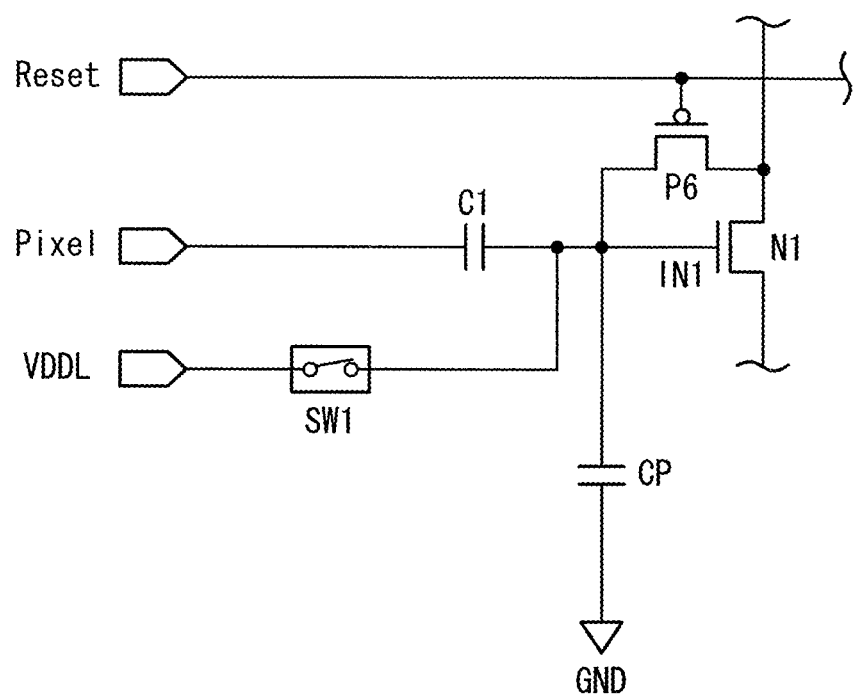
FIG. 4 is a diagram illustrating voltage variations in the input terminals of the comparison unit included the image pickup device in accordance with the first preferred embodiment of the present invention.

Subsequently, the signal level is given to the first input terminal IN1 as the pixel signal Pixel from the unit pixel 3. Hereinafter, the voltage of the first input terminal IN1 at a time (time T4) when the signal level is input will be described using FIG. 4. FIG. 4 is a diagram illustrating voltage variations in the input terminals of the comparison unit 31. FIG. 4 shows only an extracted peripheral configuration of the first input terminal. Hereinafter, a parasitic capacitor CP between the first input terminal IN1 and the ground GND will be assumed and described.

At a time (time T2) when the voltage of the first input terminal IN1 has been changed from $V_{RST}$ to $V_{DDL}$ by the switch element SW1, the voltage of the other end of the capacitive element C1 to which the reset level is given as the pixel signal Pixel is $V_R$. In addition, at a time (time T4) when the signal level has been input as the pixel signal Pixel, the voltage of the other end of the capacitive element C1 becomes $V_S$. When voltage variation of the other end of the capacitive element C1 from time T2 to time T4 becomes $\Delta V1$, $\Delta V1$ is defined as in the following Equation (1).

$$\Delta V1 = V_S - V_R \quad (1)$$

Because the transistor P6 and the switch element SW1 are in the OFF state during the period of time T2 to time T4, an amount of charge accumulated in the capacitive element C1 and the parasitic capacitor CP is retained. Thus, when voltage variation of the first input terminal IN1 from time T2 to time T4 becomes $\Delta V2$, $\Delta V2$ is defined as in the following Equation (2). In Equation (2), $C_1$ is a capacitance value of the capacitive element $C_1$ and $C_P$ is a capacitance value of the parasitic capacitor CP.

$$\Delta V2 = \frac{C_1}{C_1 + C_P} \times \Delta V1 \quad (2)$$

When $C_P$ is neglected as compared to $C_1$ ($C_1 \gg C_R$), $\Delta V2 = \Delta V1$. Because the voltage of the first input terminal IN1 is $V_{DDL}$ at time T2, the voltage VIN1 of the first input terminal IN1 at time T4 becomes the following Equation (3) using Equation (1).

$$VIN1 = V_{DDL} + (V_S - V_R) \quad (3)$$

Because $V_{DDL} < V_{RST}$ and $V_S \leq V_R$ as described above, the voltage of the first input terminal IN1 at the initiation of comparison in the comparison unit 31 according to the second read is lower than the voltage of the second input terminal IN2 to which the reference signal Ramp is given. As shown in FIG. 3, the ramp wave, which decreases with the passage of time, is given as the reference signal Ramp, so that the output of the comparison unit 31 can be reliably inverted during the comparison operation and the comparison operation by the comparison unit 31 can be ensured.

After time T4, the ramp wave is given to the second input terminal as the reference signal Ramp. At the timing when the voltage of the second input terminal to which the ramp wave has been given and the voltage of the first input terminal are substantially the same, the comparison output of the comparison unit 31 is inverted. At a time (time T5) when a predetermined time has elapsed after the input of the ramp wave to the second input terminal has been initiated, the reference signal generation unit 16 stops the ramp wave generation. Because the measurement unit 32 performs measurement in the count-down mode during the first read and the measurement unit 32 performs measurement in the count-up mode during the second read, a measurement value related to a signal component ($V_S - V_R$) corresponding to the second term of the right side of Equation (3) is obtained as a measurement value of the measurement unit 32.

As described above, according to the first preferred embodiment of the present invention, the change unit 18 (the switch element SW1) changes the voltage of the first input terminal IN1 to a voltage lower than the voltage of the first input terminal IN1 so that a voltage difference between the first input terminal IN1 and the second input terminal IN2 becomes a voltage at which the comparison operation by the comparison unit 31 is ensured after the reset operation by the transistors P6 and P7. Accordingly, the comparison unit 31 can reliably perform the comparison operation between the reference signal Ramp and the pixel signal Pixel. Furthermore, it is possible to change a voltage in an easy configuration by configuring the change unit 18 by the switch element SW1.

In addition, it is possible to solve the problems occurring in the above-described (1) and (3) by changing the voltage of the first input terminal IN1 to which the pixel signal Pixel is given to a lower voltage without changing the voltage of the second input terminal IN2 to which the reference signal Ramp is given to a higher voltage.

Second Preferred Embodiment

Next, the second preferred embodiment of the present invention will be described. A configuration of a (C)MOS image pickup device of the second preferred embodiment of the present invention is substantially the same as the configuration described in the first preferred embodiment (FIG. 1), and only an AD conversion operation is different therebetween.

Hereinafter, parts different from the first preferred embodiment will be mainly described among operations of the second preferred embodiment of the present invention. As in the first preferred embodiment, a reset level and a signal level are output by the unit pixel 3.

AD conversion is performed as follows. For example, a ramp wave (reference signal Ramp) falling at a predetermined tilt is compared to a voltage (difference signal level) corresponding to a difference between a reset level and a signal level as a pixel signal from the unit pixel 3. A period until a signal corresponding to the difference signal level is the same as the ramp wave (ramp voltage) from a point in time when a ramp wave for use in comparison processing has been generated is measured, for example, according to a reference clock, so that digital data corresponding to a magnitude of the difference signal level is obtained.

Here, a reset level in a first read operation is read as an analog pixel signal from each unit pixel 3 of a selected row of the image pickup unit 2, and then a signal level is read in a second read operation. The reset level and the signal level are input to the column AD conversion unit 30 through the vertical signal line 13 in time series.

First Read

Once the first read from the unit pixel 3 of an arbitrary pixel row to the vertical signal line 13 is stable, a reset operation of the comparison unit 31 is performed. Subsequently, the change unit 18 changes a voltage of the first input terminal of the comparison unit 31 to which the reset level has been given to a predetermined voltage lower than the reset level.

Second Read

Subsequently, during the second read, a signal level corresponding to an amount of incident light of each unit pixel 3 is read. During the second read, the reset operation of the comparison unit 31 and the change operation by the change unit 18 are not performed.

Once the second read from the unit pixel 3 of the arbitrary pixel row to the vertical signal line 13 is stable, the timing control unit 20 supplies control data of ramp wave generation to the reference signal generation unit 16. Upon receipt of the control data, the reference signal generation unit 16 outputs a ramp wave (reference signal Ramp). The comparison unit 31 compares the voltage of the second input terminal to which the ramp wave has been given from the reference signal generation unit 16 to the voltage of the first input terminal to which the difference signal level has been given, and inverts a comparison output when the two voltages are substantially the same.

The measurement unit 32 starts measurement in the count-up mode based on the comparison start by the comparison unit 31, and retains a measurement value when the comparison output of the comparison unit 31 has been inverted. That is, the measurement unit 32 retains digital data corresponding to a signal component obtained by subtracting the reset level from the signal level (CDS processing). The timing control unit 20 stops a supply of control data to the reference signal generation unit 16 and an output of the reference clock when a predetermined period has elapsed. Thereby, the reference signal generation unit 16 stops the ramp wave generation.

Figure 5:
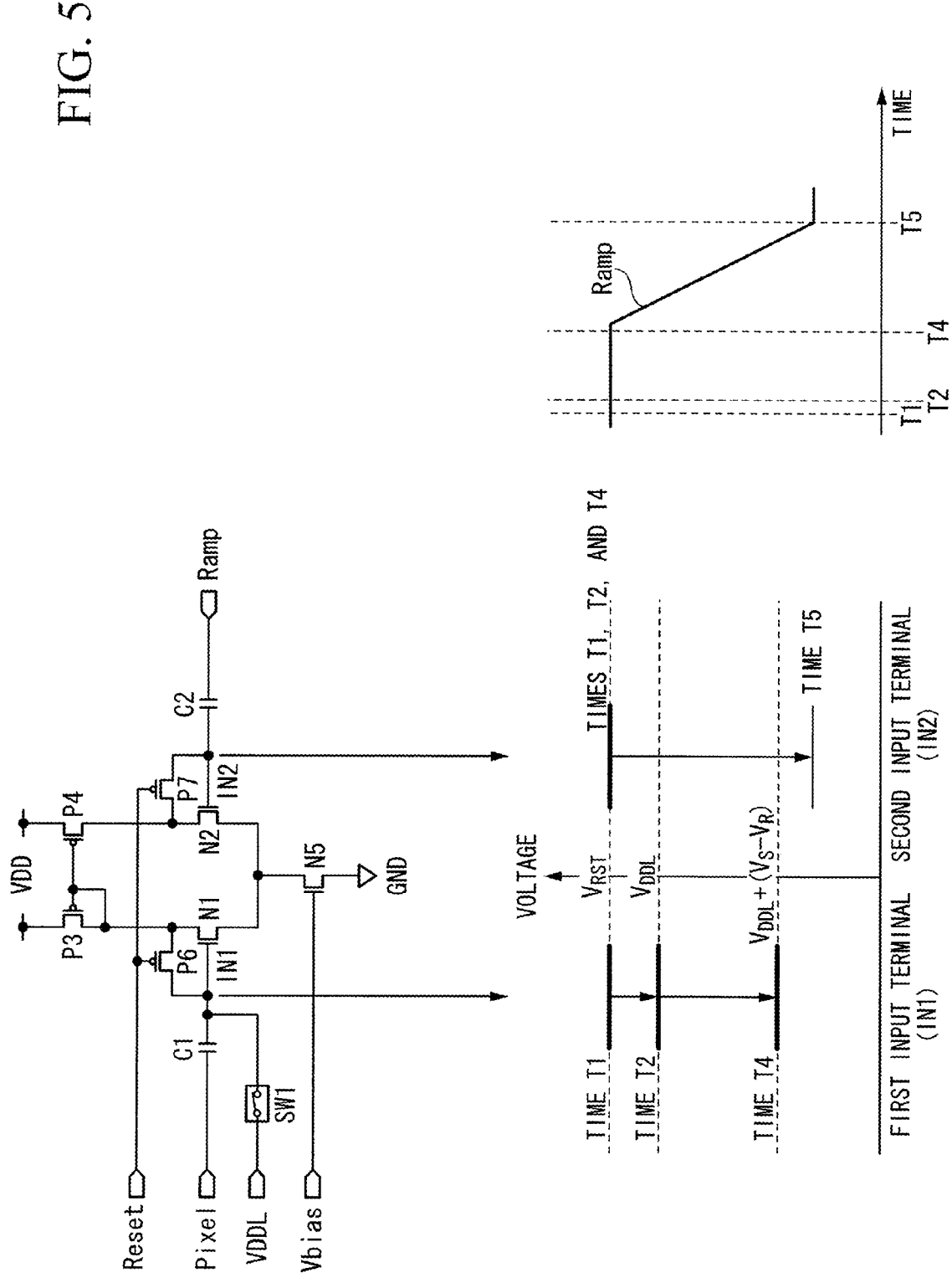
FIG. 5 is a diagram illustrating specific circuit configurations of a comparison unit and a change unit and voltage variations in input terminals of the comparison unit included the image pickup device in accordance with a second preferred embodiment of the present invention.

Next, details of voltage variations in the input terminals of the comparison unit 31 will be described. FIG. 5 is a diagram illustrating an example of specific circuit configurations of the comparison unit 31 and the change unit 18 and the voltage variations in the input terminals of the comparison unit. Because a circuit configuration shown in FIG. 5 is substantially the same as the circuit configuration shown in FIG. 3, a description thereof is omitted here.

Hereinafter, an operation of the second preferred embodiment of the present invention will be described. Here, a reset-level voltage is $V_R$, a signal-level voltage is $V_S$ ($V_S \leq V_R$), and a voltage of the voltage source VDDL is $V_{DDL}$. In FIG. 5, voltage variations of the first input terminal IN1 and the second input terminal IN2 of the differential amplifier within the comparison unit 31 and a waveform of the reference signal Ramp are shown.

Once the reset level is given to the first input terminal IN1 as the pixel signal Pixel from the unit pixel 3 and the reference signal Ramp given from the reference signal generation unit 16 to the second input terminal IN2 is stable, the voltages of the two input terminals are reset. At this time, the voltages of the two input terminals of the differential amplifier are reset to be substantially the same as a voltage $V_{RST}$. At this time (time T1), the voltage of the first input terminal IN1 is $V_{RST}$ and the voltage of the second input terminal IN2 is $V_{RST}$. After the reset, the transistors P6 and P7 are in the OFF state.

Subsequently, the switch element SW1 is switched from the OFF state to the ON state, so that the voltage of the first input terminal IN1 to which the pixel signal Pixel is given, that is, the gate voltage of the transistor N1, is reduced and changed from the voltage $V_{RST}$ to a predetermined voltage $V_{DDL}$ ($V_{DDL} < V_{RST}$). At this time (time T2), the voltage of the first input terminal IN1 is $V_{DDL}$ and the voltage of the second input terminal IN2 is $V_{RST}$. The switch element SW1 is in the OFF state after the ON state.

Subsequently, the signal level is given to the first input terminal IN1 as the pixel signal Pixel from the unit pixel 3. The voltage VIN1 of the first input terminal IN1 at a time (time T4) when the signal level has been input becomes the following Equation (4) as in the first preferred embodiment.

$$VIN1 = V_{DDL} + (V_S - V_R) \quad (4)$$

Because $V_{DDL} < V_{RST}$ and $V_S \leq V_R$ as described above, the voltage of the first input terminal IN1 at the initiation of comparison in the comparison unit 31 is lower than the voltage of the second input terminal IN2 to which the reference signal Ramp is given. The ramp wave, which decreases with the passage of time, is given as the reference signal Ramp, so that the output of the comparison unit 31 can be reliably inverted during the comparison operation and the comparison operation by the comparison unit 31 can be ensured.

After time T4, the ramp wave is given to the second input terminal as the reference signal Ramp. At the timing when the voltage of the second input terminal to which the ramp wave has been given and the voltage of the first input terminal are substantially the same, the comparison output of the comparison unit 31 is inverted. At a time (time T5) when a predetermined time has elapsed after the input of the ramp wave to the second input terminal has been initiated, the reference signal generation unit 16 stops the ramp wave generation. Because the measurement unit 32 performs measurement in the count-up mode during the second read, a measurement value related to $V_{DDL} + (V_S - V_R)$ of Equation (4) is obtained as a measurement value of the measurement unit 32.

In the second preferred embodiment of the present invention, it is possible to obtain digital data in one AD conversion operation. Although digital data in which an offset component ($V_{DDL}$) overlaps a signal component ($V_S - V_R$) is obtained by reducing and changing the voltage of the first input terminal to which the reset level has been given to a predetermined voltage, the offset component can be suppressed by calculating digital data of the offset component using data of a light-blocking pixel or a dummy pixel provided in the image pickup unit 2 and subtracting the digital data of the offset component from a measurement value of the measurement unit 32.

In addition, it is possible to solve the problems occurring in the above-described (1) and (3) by changing the voltage of the first input terminal IN1, to which the pixel signal Pixel is given, to a lower voltage without changing the voltage of the second input terminal IN2, to which the reference signal Ramp is given, to a higher voltage.

Third Preferred Embodiment

Next, the third preferred embodiment of the present invention will be described. FIG. 6 is a block diagram illustrating an example of a configuration of a (C)MOS image pickup device in accordance with the third preferred embodiment of the present invention. Hereinafter, a configuration of the third preferred embodiment of the present invention will be described. Among configurations of an image pickup device 1b shown in FIG. 6, only an analog unit 6 is different from that of FIG. 1. The analog unit 6 of the third preferred embodiment of the present invention has a subtraction (CDS processing) circuit. Because configurations other than the analog unit 6 are substantially the same as those shown in FIG. 1, a description thereof is omitted here.

Figure 7:
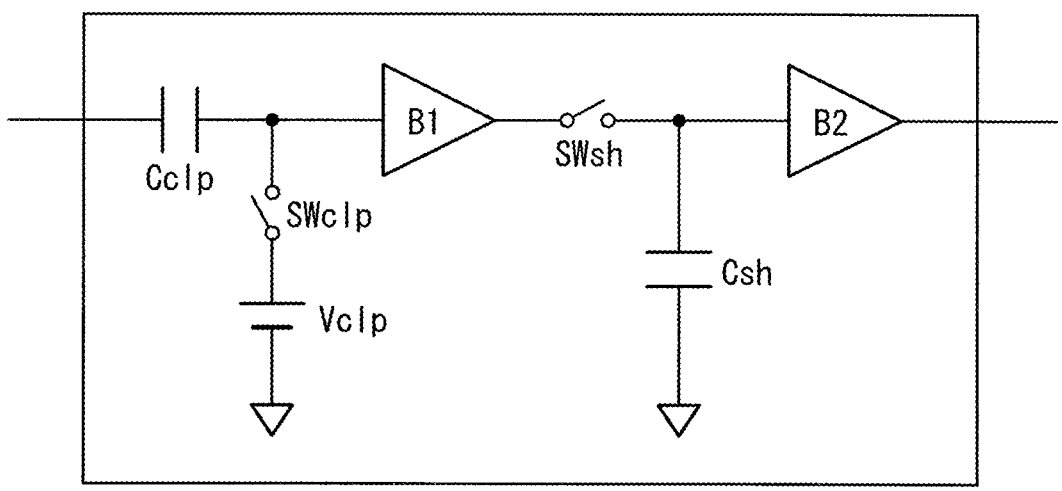
FIG. 7 is a circuit diagram illustrating a configuration of an analog unit included in the image pickup device in accordance with a third preferred embodiment of the present invention.

FIG. 7 is a circuit diagram illustrating an example of the configuration of the analog unit 6. The configuration shown in FIG. 7 includes a CDS processing function as means for acquiring a signal component corresponding to a difference between a first signal voltage and a second signal voltage. The analog unit 6 includes a clamp capacitor Cclp connected to the vertical signal line 13, a clamp switch SWclp for clamping the clamp capacitor alp to a clamp bias Vclp, a sample/hold capacitor Csh for sampling/holding a signal, a sample/hold switch SWsh, a buffer unit B1, and a buffer unit B2. When CDS processing is performed, the analog unit 6 controls the clamp switch SWclp and the sample/hold switch SWsh based on two pulses of a clamp pulse and a sampling pulse given from the timing control unit 20, and acquires a signal component by carrying out subtraction (CDS processing) between the reset level and the signal level for a pixel signal of a voltage mode input via the vertical signal line 13.

Next, an operation of the third preferred embodiment of the present invention will be described. A difference from the operation of the image apparatus 1a in accordance with the first preferred embodiment is an AD conversion operation based on a subtraction (CDS processing) circuit installed in the analog unit 6. Hereinafter, parts different from the first preferred embodiment among operations of the third preferred embodiment of the present invention will be mainly described. As in the first preferred embodiment, a reset level and a signal level are output by the unit pixel 3. Here, a reset-level voltage is $V_R$ and a signal-level voltage is $V_S$ ($V_S \leq V_R$).

The AD conversion is performed as follows. For example, a ramp wave (reference signal Ramp) falling at a predetermined tilt is compared to a voltage (difference signal level) corresponding to a difference between a reset level and a signal level as a pixel signal from the unit pixel 3. A period until a signal corresponding to the difference signal level is the same as the ramp wave (ramp voltage) from a point in time when a ramp wave for use in comparison processing has been generated is measured, for example, according to a reference clock, so that digital data corresponding to a magnitude of the difference signal level is obtained.

Here, a reset level in a first read operation is read as an analog pixel signal from each unit pixel 3 of a selected row of the image pickup unit 2, and then a signal level is read in a second read operation. The reset level and the signal level are input to the analog unit 6 through the vertical signal line 13 in time series.
First Read Once the first read from the unit pixel 3 of an arbitrary pixel row to the vertical signal line 13 is stable, the clamp switch SWclp and the sample/hold switch SWsh are in the ON state and the reset operation of the comparison unit 31 is performed. Subsequently, the change unit 18 changes a voltage of the first input terminal of the comparison unit 31 to which the reset level has been given to a predetermined voltage lower than the reset level. Subsequently, the clamp switch SWclp is in the OFF state.
Second Read Subsequently, during the second read, a signal level corresponding to an amount of incident light of each unit pixel 3 is read. During the second read, the reset operation of the comparison unit 31 and the change operation by the change unit 18 are not performed. In addition, if a voltage input to the clamp capacitor Cclp is varied from the reset level to the signal level because the clamp switch SWclp is in the OFF state, an input voltage of the buffer unit B1 is varied by a voltage ($V_S-V_R$) corresponding to the variation. According to this variation, input and output voltages of the buffer unit B2 are also varied. Thereby, a difference signal level ($V_S-V_R$) between the signal level and the reset level is given to the first input terminal of the comparison unit 31. After the signal level is read, the sample/hold switch SWsh is in the OFF state.

Once the second read from the unit pixel 3 of the arbitrary pixel row to the vertical signal line 13 is stable, the timing control unit 20 supplies control data of ramp wave generation to the reference signal generation unit 16. Upon receipt of the control data, the reference signal generation unit 16 outputs a ramp wave (reference signal Ramp). The comparison unit 31 compares the voltage of the second input terminal to which the ramp wave has been given to the voltage of the first input terminal to which the difference signal level has been given.

In the third preferred embodiment of the present invention, as in the first preferred embodiment, even when slight variation remains in the voltages of the two input terminals of the differential amplifier constituting the comparison unit 31 after the reset operation of the comparison unit 31, the voltage of the first input terminal IN1 at the initiation of comparison in the comparison unit 31 is lower than the voltage of the second input terminal IN2 to which the reference signal Ramp is given. Thus, it is possible to reliably invert the output of the comparison unit 31 during the comparison operation and ensure the comparison operation by the comparison unit 31.

The comparison unit 31 compares the voltage of the second input terminal to which the ramp wave has been given from the reference signal generation unit 16 to the voltage of the first input terminal to which the difference signal level has been given, and inverts a comparison output when the two voltages are substantially the same. The measurement unit 32 starts measurement in the count-up mode based on the comparison start by the comparison unit 31, and retains a measurement value when the comparison output of the comparison unit 31 has been inverted. That is, the measurement unit 32 retains digital data corresponding to a signal component obtained by subtracting the reset level from the signal level (correlated double sampling (CDS) processing). The timing control unit 20 stops a supply of control data to the reference signal generation unit 16 and an output of the reference clock when a predetermined period has elapsed. Thereby, the reference signal generation unit 16 stops the ramp wave generation. Because the measurement unit 32 performs measurement in the count-up mode during the second read, a measurement value related to $V_{DDL}+(V_S-V_R)$ of Equation (3) is obtained as a measurement value of the measurement unit 32.

In the third preferred embodiment of the present invention, it is possible to obtain digital data in one AD conversion operation. Although digital data in which an offset component ($V_{DDL}$) overlaps a signal component ($V_S$–$V_R$) is obtained by reducing and changing the voltage of the first input terminal to which the reset level has been given to a predetermined voltage, the offset component can be suppressed by calculating digital data of the offset component using data of a light-blocking pixel or a dummy pixel provided in the image pickup unit 2 and subtracting the digital data of the offset component from a measurement value of the measurement unit 32.

In addition, it is possible to solve the problems occurring in the above-described (1) and (3) by changing the voltage of the first input terminal IN1 to which the pixel signal Pixel is given to a lower voltage without changing the voltage of the second input terminal IN2 to which the reference signal Ramp is given to a higher voltage.

Fourth Preferred Embodiment

Figure 8:
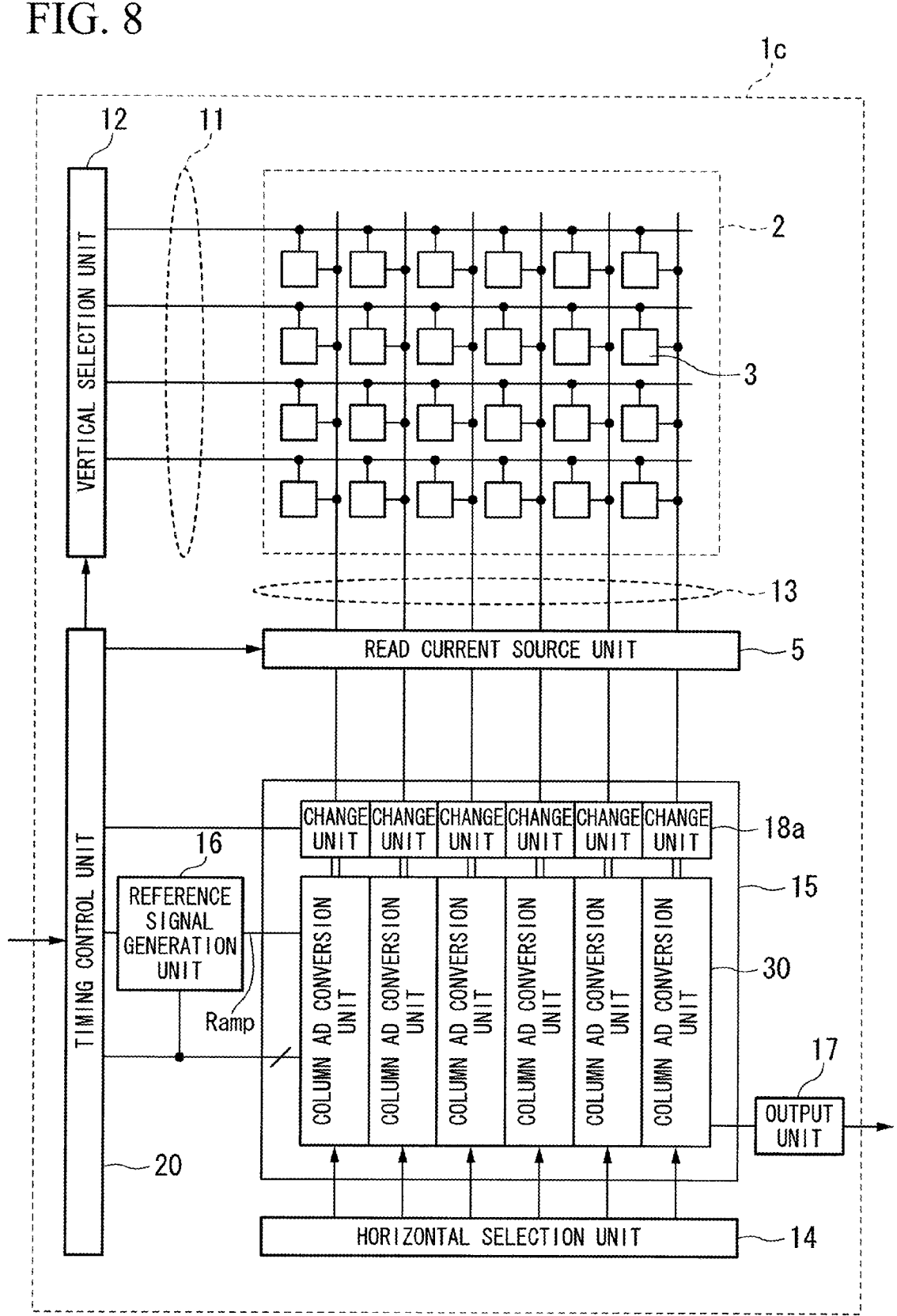
FIG. 8 is a block diagram illustrating a configuration of an image pickup device in accordance with a fourth preferred embodiment of the present invention.

Next, the fourth preferred embodiment of the present invention will be described. FIG. 8 is a block diagram illustrating an example of a (C)MOS image pickup device in accordance with the fourth preferred embodiment of the present invention. Hereinafter, a configuration of the fourth preferred embodiment of the present invention will be described. Among configurations of an image pickup device 1c shown in FIG. 8, only a change unit 18a is different from that of FIG. 1. The change unit 18a of the fourth preferred embodiment of the present invention is provided in each column, and includes a capacitive element and a switch element. Because configurations other than the change unit 18a are substantially the same as those shown in FIG. 1, a description thereof is omitted here.

Hereinafter, parts different from the first preferred embodiment among operations of the fourth preferred embodiment of the present invention will be mainly described. As in the first preferred embodiment, a reset level and a signal level are output by the unit pixel 3.

AD conversion is performed as follows. For example, a ramp wave (reference signal Ramp) falling at a predetermined tilt is compared to a voltage of a reset level or a signal level as a pixel signal from the unit pixel 3. A period until a signal corresponding to the difference signal level is the same as the ramp wave (ramp voltage) from a point in time when a ramp wave for use in comparison processing has been generated is measured, for example, according to a reference clock, so that digital data corresponding to a magnitude of the reset level or the signal level is obtained.

Here, a reset level in a first read operation is read as an analog pixel signal from each unit pixel 3 of a selected row of the image pickup unit 2, and then a signal level is read in a second read operation. The reset level and the signal level are input to the column AD conversion unit 30 through the vertical signal line 13 in time series.

First Read

Once the first read from the unit pixel 3 of an arbitrary pixel row to the vertical signal line 13 is stable, a reset operation of the comparison unit 31 is performed. Subsequently, the change unit 18a changes a voltage of the first input terminal of the comparison unit 31 to which the reset level has been given to a predetermined voltage lower than the reset level. Details of a change operation by the change unit 18a will be described later. Thereafter, the timing control unit 20 supplies control data of ramp wave generation to the reference signal generation unit 16. Upon receipt of the control data, the reference signal generation unit 16 outputs a ramp wave (reference signal Ramp). The comparison unit 31 compares the voltage of the second input terminal to which the ramp wave has been given from the reference signal generation unit 16 to the voltage of the first input terminal to which the reset level has been given, and inverts a comparison output when the two voltages are substantially the same.

The measurement unit 32 starts measurement in the count-down mode based on the comparison start by the comparison unit 31, and retains a measurement value when the comparison output of the comparison unit 31 has been inverted. That is, the measurement unit 32 retains digital data corresponding to the reset level. The timing control unit 20 stops a supply of control data to the reference signal generation unit 16 and an output of the reference clock when a predetermined period has elapsed. Thereby, the reference signal generation unit 16 stops the ramp wave generation.

Second Read

Subsequently, during the second read, a signal level corresponding to an amount of incident light of each unit pixel 3 is read. During the second read, the reset operation of the comparison unit 31 and the change operation by the change unit 18a are not performed.

Once the second read from the unit pixel 3 of the arbitrary pixel row to the vertical signal line 13 is stable, the timing control unit 20 supplies control data of ramp wave generation to the reference signal generation unit 16. Upon receipt of the control data, the reference signal generation unit 16 outputs a ramp wave (reference signal Ramp). The comparison unit 31 compares the voltage of the second input terminal to which the ramp wave has been given from the reference signal generation unit 16 to the voltage of the first input terminal to which the signal level has been given, and inverts a comparison output when the two voltages are substantially the same.

The measurement unit 32 starts measurement in the count-up mode based on the comparison start by the comparison unit 31, and retains a measurement value when the comparison output of the comparison unit 31 has been inverted. That is, the measurement unit 32 retains digital data corresponding to a signal component obtained by subtracting the reset level from the signal level (correlated double sampling (CDS) processing). The timing control unit 20 stops a supply of control data to the reference signal generation unit 16 and an output of the reference clock when a predetermined period has elapsed. Thereby, the reference signal generation unit 16 stops the ramp wave generation.

Figure 9:
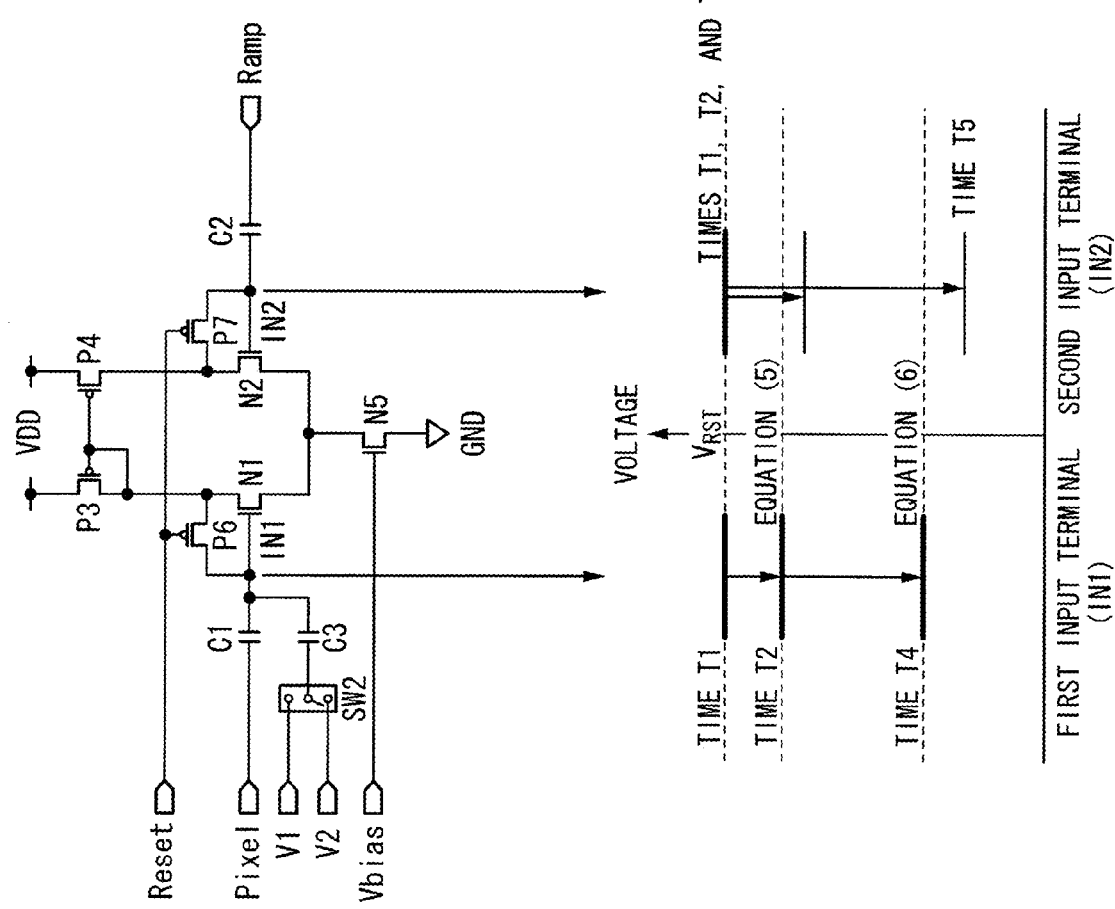
FIG. 9 is a diagram illustrating specific circuit configurations of a comparison unit and a change unit and voltage variations in input terminals of the comparison unit included the image pickup device in accordance with the fourth preferred embodiment of the present invention.
Figure 10:
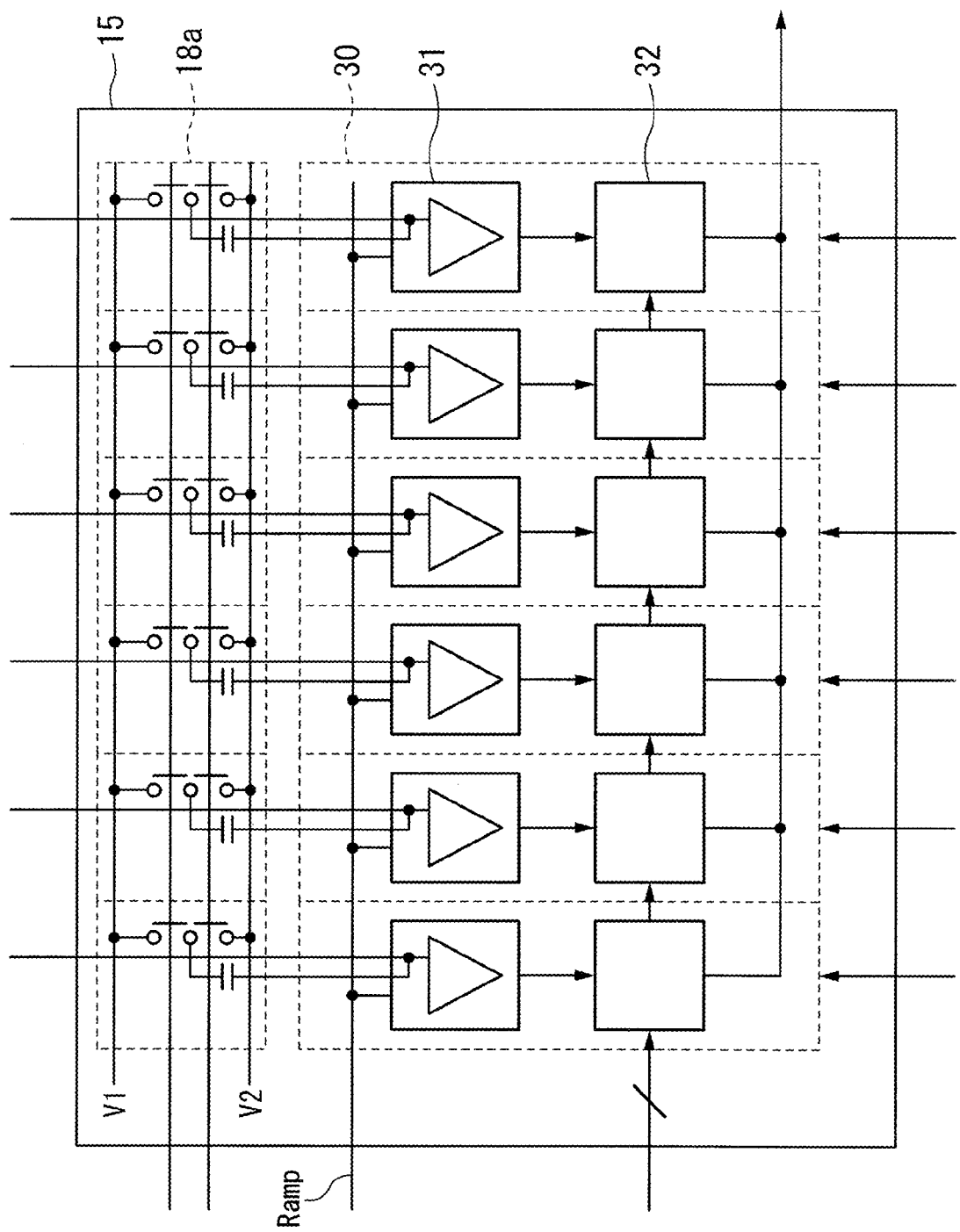
FIG. 10 is a block diagram illustrating a configuration of a column processing unit included the image pickup device in accordance with the fourth preferred embodiment of the present invention.

Next, details of configurations of the comparison unit 31 and the change unit 18a and voltage variations in the input terminals of the comparison unit 31 will be described. FIG. 9 is a diagram illustrating an example of specific circuit configurations of the comparison unit 31 and the change unit 18a and the voltage variations in the input terminals of the comparison unit. FIG. 10 is a block diagram illustrating an example of a circuit configuration of a column processing unit 15 including the comparison unit 31 and the change unit 18a. Hereinafter, a circuit configuration of the fourth preferred embodiment of the present invention will be described. Hereinafter, only configurations different from those shown in FIG. 3 will be described.

The change unit 18a includes a switch element SW2 (a second switch element) and a capacitive element C3 (a second capacitive element) provided in each column. One end of the capacitive element C3 is connected to a gate of a transistor N1, and the other end of the capacitive element C3 is connected to a first terminal of the switch element SW2. A second terminal of the switch element SW2 is connected to a voltage source V1 (a first voltage source), and a third terminal of the switch element SW2 is connected to a voltage source V2 (a second voltage source). The switch element SW2 switches a state in which the voltage source V1 is connected to the other end of the capacitive element C3 by short-circuiting the first terminal and the second terminal and a state in which the voltage source V2 is connected to the other end of the capacitive element C3 by short-circuiting the first terminal and the third terminal.

Hereinafter, an operation of the fourth preferred embodiment of the present invention will be described. Here, a voltage of the voltage source V1 is $V_1$, a voltage of the voltage source V2 is $V_2$ ($V_2<V_1$), a reset-level voltage is $V_R$ ($V_R<V_{DD}$ when a voltage of a power supply VDD is $V_{DD}$), a signal-level voltage is $V_S$ ($V_S \leq V_R$), a capacitance value of the capacitive element C1 is $C_1$, and a capacitance value of the capacitive element C3 is $C_3$. In FIG. 9, voltage variations of the first input terminal IN1 and the second input terminal IN2 of the differential amplifier within the comparison unit 31 and a waveform of the reference signal Ramp are shown.

Once the reset level is given to the first input terminal IN1 as the pixel signal Pixel from the unit pixel 3 and the reference signal Ramp given from the reference signal generation unit 16 to the second input terminal IN2 is stable, the voltages of the two input terminals are reset. That is, the voltages of the two input terminals of the differential amplifier are reset to be substantially the same voltage $V_{RST}$. At this time (time T1), the voltage of the first input terminal IN1 is $V_{RST}$ and the voltage of the second input terminal IN2 is $V_{RST}$. During the reset operation, the other end of the capacitive element C3 is connected to the voltage source V1 by the switch element SW2. After the reset, the transistors P6 and P7 are in the OFF state.

Subsequently, the switch element SW2 connects the other end of the capacitive element C3 to the voltage source V2, so that the voltage of the first input terminal IN1 to which the pixel signal Pixel is given, that is, a gate voltage of the transistor N1, is reduced and changed from the voltage $V_{RST}$ to a predetermined voltage. Because the voltage of the other end of the capacitive element C3 is varied from $V_1$ to $V_2$ by ($V_2$-$V_1$), the voltage VIN1 of the first input terminal IN1 is defined as in the following Equation (5) at this time (time T2).

$$VIN1 = V_{RST} + \frac{C_3}{C_1 + C_3} \times (V_2 - V_1) \quad (5)$$

Even when slight variation remains in the voltages of the two input terminals of the differential amplifier constituting the comparison unit 31 after the reset operation of the comparison unit 31, $V_2<V_1$, so that the voltage of the first input terminal IN1 at the initiation of comparison by the comparison unit 31 related to the first read is lower than the voltage of the second input terminal IN2 to which the reference signal Ramp is given. As shown in FIG. 9, the ramp wave, which decreases with the passage of time, is given as the reference signal Ramp, so that the output of the comparison unit 31 can be reliably inverted during the comparison operation and the comparison operation by the comparison unit 31 can be ensured.

After time T2, the ramp wave is given to the second input terminal as the reference signal Ramp. At the timing when the voltage of the second input terminal to which the ramp wave has been given and the reset voltage of the first input terminal are substantially the same, the comparison output of the comparison unit 31 is inverted. At a time (time T3) when a predetermined time has elapsed after the input of the ramp wave to the second input terminal has been initiated, the reference signal generation unit 16 stops the ramp wave generation.

Subsequently, the signal level is given to the first input terminal IN1 as the pixel signal Pixel from the unit pixel 3. At a time (time T2) when the other end of the capacitive element C3 is connected to the voltage source V2 by the switch element SW2, the voltage of the other end of the capacitive element C1 to which the reset level is given as the pixel signal Pixel is $V_R$. In addition, the voltage of the other end of the capacitive element C1 is $V_S$ at a time (time T4) when the signal level is input as the pixel signal Pixel. Because the voltage of the first input terminal IN1 at time T2 is Equation (5), the voltage VIN1 of the first input terminal IN1 at time T4 is defined as in the following Equation (6) using Equation (5).

$$VIN1 = V_{RST} + \frac{C_3}{C_1 + C_3} \times (V_2 - V_1) + \frac{C_1}{C_1 + C_3} \times (V_S - V_R) \quad (6)$$

Because $V_2<V_1$ and $V_S<V_R$, the voltage of the first input terminal IN1 at the initiation of comparison of the comparison unit 31 related to the second read is lower than the voltage of the second input terminal IN2 to which the reference signal Ramp is given. As shown in FIG. 9, the ramp wave, which decreases with the passage of time, is given as the reference signal Ramp, so that the output of the comparison unit 31 can be reliably inverted during the comparison operation and the comparison operation by the comparison unit 31 can be ensured.

After time T4, the ramp wave is given to the second input terminal as the reference signal Ramp. At the timing when the voltage of the second input terminal to which the ramp wave has been given and the voltage of the first input terminal are substantially the same, the comparison output of the comparison unit 31 is inverted. At a time (time T5) when a predetermined time has elapsed after the input of the ramp wave to the second input terminal has been initiated, the reference signal generation unit 16 stops the ramp wave generation. Because the measurement unit 32 performs measurement in the count-down mode during the first read and the measurement unit 32 performs measurement in the count-up mode during the second read, a measurement value related to the third term of the right side of Equation (6) is obtained as a measurement value of the measurement unit 32.

As described above, according to the fourth preferred embodiment of the present invention, the change unit 18 (the switch element SW2 and the capacitive element C3) changes the voltage of the first input terminal IN1 to a lower voltage so that a voltage difference between the first input terminal IN1 and the second input terminal IN2 becomes a voltage at which the comparison operation by the comparison unit 31 is ensured after the reset operation by the transistors P6 and P7. Accordingly, the comparison unit 31 can reliably perform the comparison operation between the reference signal Ramp and the pixel signal Pixel.

In addition, it is possible to solve the problems occurring in the above-described (1) and (3) by changing the voltage of the first input terminal IN1 to which the pixel signal Pixel is given to a lower voltage without changing the voltage of the second input terminal IN2 to which the reference signal Ramp is given to a higher voltage.

As described above, variations of manufacturing conditions between adjacent columns of the image pickup device are about the same. However, variations of the manufacturing conditions may be increased between all columns of the image pickup device and the reset variation ΔVRST may be about 100 mV. In the first preferred embodiment, it is necessary to make a change to a voltage including the reset variation ΔVRST because the voltages of the input terminals of the differential amplifier are directly changed via the common switch element SW1 in all columns. Therefore, the voltages of the input terminals of the differential amplifier are unnecessarily changed to a lower voltage, so that the comparison operation by the comparison unit 31 is time-consuming and the AD conversion is time-consuming.

On the other hand, in the fourth preferred embodiment of the present invention, the voltages of the input terminals of the differential amplifier are changed by giving predetermined voltage variation via the capacitive element C3. Because variations of manufacturing conditions of the two input terminals within the same differential amplifier are small, reset variations are small. Therefore, because it is preferable to consider only reset variations of the two input terminals within the same differential amplifier to give the predetermined voltage variation, the AD conversion time is shorter than in the first preferred embodiment without unnecessarily changing the voltages of the input terminals of the differential amplifier to a low voltage. Accordingly, it is possible to solve the problem occurring in the above-described (2).

Fifth Preferred Embodiment

Next, the fifth preferred embodiment of the present invention will be described. A configuration of a (C)MOS image pickup device of the fifth preferred embodiment of the present invention is substantially the same as described in the fourth preferred embodiment (FIG. 8), and only the AD conversion operation is different.

Hereinafter, parts different from the first preferred embodiment among operations of the fifth preferred embodiment of the present invention will be mainly described. As in the first preferred embodiment, a reset level and a signal level are output by the unit pixel 3.

AD conversion is performed as follows. For example, a ramp wave (reference signal Ramp) falling at a predetermined tilt is compared to a voltage (difference signal level) corresponding to a difference between a reset level and a signal level as a pixel signal from the unit pixel 3. A period until a signal corresponding to the difference signal level is the same as the ramp wave (ramp voltage) from a point in time when a ramp wave for use in comparison processing has been generated is measured, for example, according to a reference clock, so that digital data corresponding to a magnitude of the difference signal level is obtained.

Here, a reset level in a first read operation is read as an analog pixel signal from each unit pixel 3 of a selected row of the image pickup unit 2, and then a signal level is read in a second read operation. The reset level and the signal level are input to the column AD conversion unit 30 through the vertical signal line 13 in time series.

First Read

Once the first read from the unit pixel 3 of an arbitrary pixel row to the vertical signal line 13 is stable, a reset operation of the comparison unit 31 is performed.

Subsequently, the change unit 18a changes a voltage of the first input terminal of the comparison unit 31 to which the reset level has been given to a predetermined voltage lower than the reset level.

Second Read

Subsequently, during the second read, a signal level corresponding to an amount of incident light of each unit pixel 3 is read. During the second read, the reset operation of the comparison unit 31 and the change operation by the change unit 18a are not performed.

Once the second read from the unit pixel 3 of the arbitrary pixel row to the vertical signal line 13 is stable, the timing control unit 20 supplies control data of ramp wave generation to the reference signal generation unit 16. Upon receipt of the control data, the reference signal generation unit 16 outputs a ramp wave (reference signal Ramp). The comparison unit 31 compares the voltage of the second input terminal to which the ramp wave has been given from the reference signal generation unit 16 to the voltage of the first input terminal to which the difference signal level has been given, and inverts a comparison output when the two voltages are substantially the same.

The measurement unit 32 starts measurement in the count-up mode based on the comparison start by the comparison unit 31, and retains a measurement value when the comparison output of the comparison unit 31 has been inverted. That is, the measurement unit 32 retains digital data corresponding to a signal component obtained by subtracting the reset level from the signal level (correlated double sampling (CDS) processing). The timing control unit 20 stops a supply of control data to the reference signal generation unit 16 and an output of the reference clock when a predetermined period has elapsed. Thereby, the reference signal generation unit 16 stops the ramp wave generation.

Figure 11:
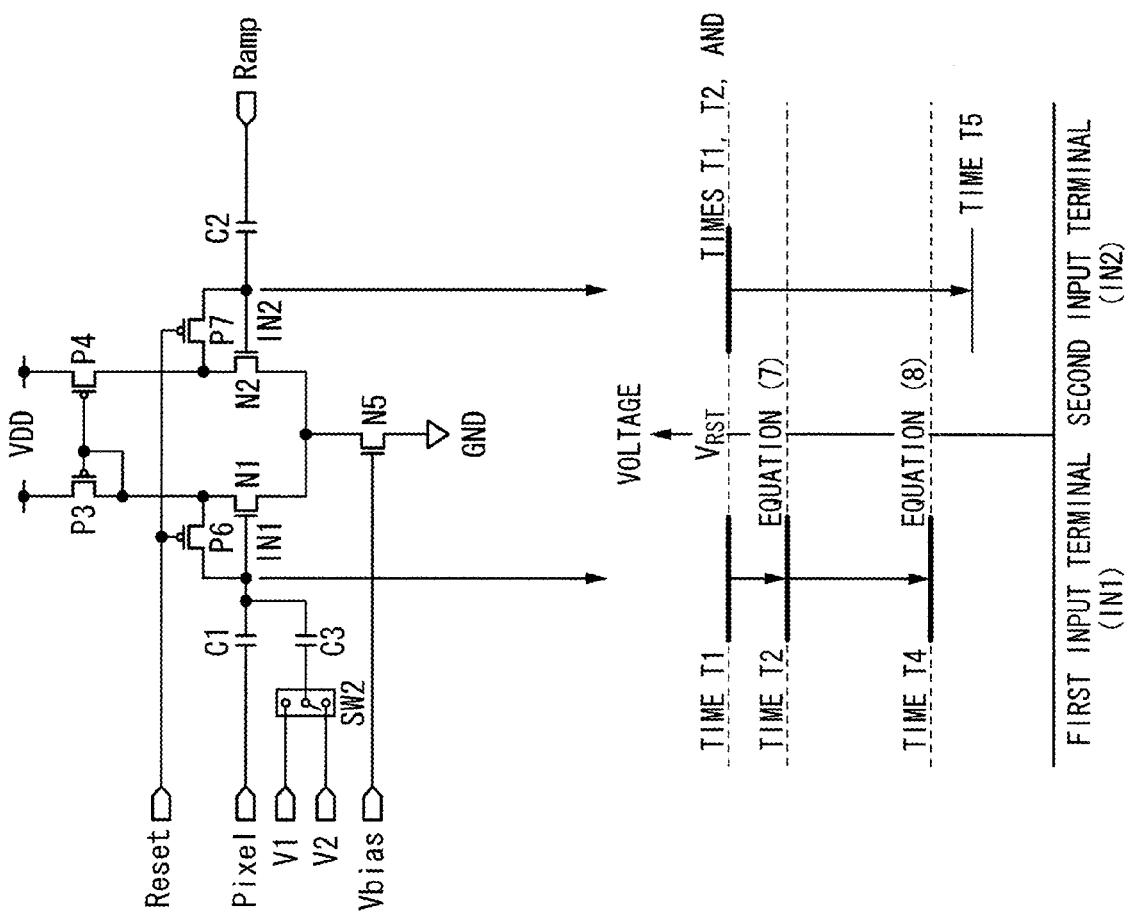
FIG. 11 is a diagram illustrating specific circuit configurations of a comparison unit and a change unit and voltage variations in input terminals of the comparison unit included the image pickup device in accordance with a fifth preferred embodiment of the present invention.

Next, details of a configuration of the comparison unit 31 and voltage variations in the input terminals of the comparison unit 31 will be described. FIG. 11 is a diagram illustrating an example of a specific circuit configuration of the comparison unit 31 and the voltage variations in the input terminals of the comparison unit. Because the circuit configuration shown in FIG. 11 is substantially the same as that shown in FIG. 9, a description thereof is omitted here.

Hereinafter, an operation of the fifth preferred embodiment of the present invention will be described. Here, a voltage of the voltage source V1 is $V_1$, a voltage of the voltage source V2 is $V_2$ ($V_2 < V_1$), a reset-level voltage is $V_R$ ($V_R < V_{DD}$ when a voltage of a power supply VDD is $V_{DD}$), a signal-level voltage is $V_S$ ($V_S \leq V_R$), a capacitance value of the capacitive element C1 is $C_1$, and a capacitance value of the capacitive element C3 is $C_3$. In FIG. 11, voltage variations of the first input terminal IN1 and the second input terminal IN2 of the differential amplifier within the comparison unit 31 and a waveform of the reference signal Ramp are shown.

Once the reset level is given to the first input terminal IN1 as the pixel signal Pixel from the unit pixel 3 and the reference signal Ramp given from the reference signal generation unit 16 to the second input terminal IN2 is stable, the voltages of the two input terminals are reset. At this time, the voltages of the two input terminals of the differential amplifier are reset to be substantially the same voltage $V_{RST}$. At this time (time T1), the voltage of the first input terminal IN1 is $V_{RST}$ and the voltage of the second input terminal IN2 is $V_{RST}$. During the reset operation, the other end of the capacitive element C3 is connected to the voltage source V1 by the switch element SW2. After the reset, the transistors P6 and P7 are in the OFF state. Subsequently, the switch element SW2 connects the other end of the capacitive element C3 to the voltage source V2, so that the voltage of the first input terminal IN1 to which the pixel signal Pixel is given, that is, a gate voltage of the transistor N1, is reduced and changed from the voltage $V_{RST}$ to a predetermined voltage. Because the voltage of the other end of the capacitive element C3 is varied from $V_1$ to $V_2$ by ($V_2 - V_1$), the voltage VIN1 of the first input terminal IN1 is defined as in the following Equation (7) at this time (time T2).

$$VIN1 = V_{RST} + \frac{C_3}{C_1 + C_3} \times (V_2 - V_1) \qquad (7)$$

Subsequently, the signal level is given to the first input terminal IN1 as the pixel signal Pixel from the unit pixel 3. At a time (time T4) when the signal level has been input as the pixel signal Pixel, the voltage VIN1 of the first input terminal IN1 is defined as in the following Equation (8) as in the fourth preferred embodiment.

$$VIN1 = V_{RST} + \frac{C_3}{C_1 + C_3} \times (V_2 - V_1) + \frac{C_1}{C_1 + C_3} \times (V_S - V_R) \quad (8)$$

Because $V_1 < V_1$ and $V_S < V_R$, the voltage of the first input terminal IN1 at the initiation of comparison of the comparison unit 31 related to the second read is lower than the voltage of the second input terminal IN2 to which the reference signal Ramp is given. As shown in FIG. 11, the ramp wave, which decreases with the passage of time, is given as the reference signal Ramp, the output of the comparison unit 31 can be reliably inverted during the comparison operation and the comparison operation by the comparison unit 31 can be ensured.

After time T4, the ramp wave is given to the second input terminal as the reference signal Ramp. At the timing when the voltage of the second input terminal to which the ramp wave has been given and the voltage of the first input terminal are substantially the same, the comparison output of the comparison unit 31 is inverted. At a time (time T5) when a predetermined time has elapsed after the input of the ramp wave to the second input terminal has been initiated, the reference signal generation unit 16 stops the ramp wave generation. Because the measurement unit 32 performs measurement in the count-up mode during the second read, a measurement value related to Equation (8) is obtained as a measurement value of the measurement unit 32.

In the fifth preferred embodiment of the present invention, it is possible to obtain digital data in one AD conversion operation. Although digital data in which, offset components (the first and second terms of the right side of Equation (8)) overlap a signal component (the third term of the right side of Equation (8)) is obtained by reducing and changing the voltage of the first input terminal to which the reset level is given to a predetermined voltage, the offset components can be suppressed by calculating the digital data of the offset components using data of a light-blocking pixel or a dummy pixel provided in the image pickup unit 2 and subtracting the digital data of the offset components from a measurement value of the measurement unit 32.

In addition, it is possible to solve the problems occurring in the above-described (1) and (3) by changing the voltage of the first input terminal IN1 to which the pixel signal Pixel is given to a lower voltage without changing the voltage of the second input terminal IN2 to which the reference signal Ramp is given to a higher voltage. Further, it is possible to solve the problem occurring in the above-described (2) by giving predetermined voltage variation via the capacitive element C3 to change the voltage of the input terminal of the differential amplifier.

Sixth Preferred Embodiment

Figure 12:
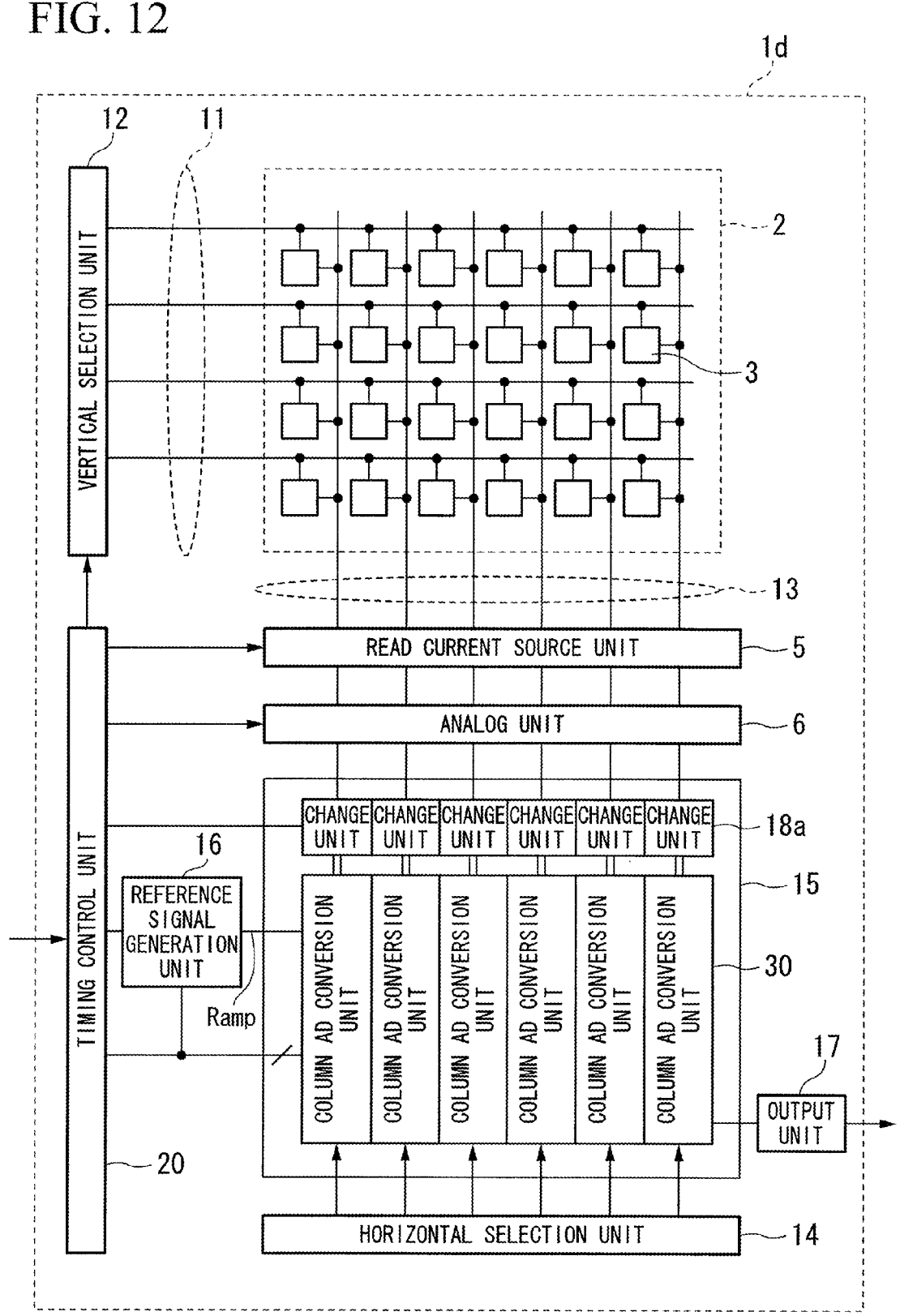
FIG. 12 is a block diagram illustrating a configuration of an image pickup device in accordance with a sixth preferred embodiment of the present invention.

Next, the sixth preferred embodiment of the present invention will be described. FIG. 12 is a block diagram illustrating an example of a configuration of a (C)MOS image pickup device in accordance with the sixth preferred embodiment of the present invention. Hereinafter, a configuration of the sixth preferred embodiment of the present invention will be described. Among configurations of an image pickup device 1d shown in FIG. 12, an analog unit 6 is different from that of FIG. 8. The analog unit 6 of the sixth preferred embodiment of the present invention has a subtraction (CDS processing) circuit. Because configurations other than the analog unit 6 are substantially the same as those shown in FIG. 12, a description thereof is omitted here.

Next, an operation of the sixth preferred embodiment of the present invention will be described. A difference from the operation of the image apparatus 1c in accordance with the fourth preferred embodiment is an AD conversion operation based on a subtraction (CDS processing) circuit installed in the analog unit 6. Hereinafter, parts different from the fourth preferred embodiment among operations of the sixth preferred embodiment of the present invention will be mainly described. As in the first preferred embodiment, a reset level and a signal level are output by the unit pixel 3.

The AD conversion is performed as follows. For example, a ramp wave (reference signal Ramp) falling at a predetermined tilt is compared to a voltage (difference signal level) corresponding to a difference between a reset level and a signal level as a pixel signal from the unit pixel 3. A period until a signal corresponding to the difference signal level is the same as the ramp wave (ramp voltage) from a point in time when a ramp wave for use in comparison processing has been generated is measured, for example, according to a reference clock, so that digital data corresponding to a magnitude of the difference signal level is obtained.

Here, a reset level in a first read operation is read as an analog pixel signal from each unit pixel 3 of a selected row of the image pickup unit 2, and then a signal level is read in a second read operation. The reset level and the signal level are input to the analog unit 6 through the vertical signal line 13 in time series.

First Read

Once the first read from the unit pixel 3 of an arbitrary pixel row to the vertical signal line 13 is stable, the clamp switch SWclp and the sample/hold switch SWsh shown in FIG. 7 are in the ON state and the reset operation of the comparison unit 31 is performed. Subsequently, the change unit 18a changes a voltage of the first input terminal of the comparison unit 31 to which the reset level has been given to a predetermined voltage lower than the reset level. Subsequently, the clamp switch SWclp is in the OFF state.

Second Read

Subsequently, during the second read, a signal level corresponding to an amount of incident light of each unit pixel 3 is read. During the second read, the reset operation of the comparison unit 31 and the change operation by the change unit 18a are not performed. In addition, if a voltage input to the clamp capacitor Cclp is varied from the reset level to the signal level, a difference signal level ($V_S - V_R$) between the signal level and the reset level is given to the first input terminal of the comparison unit 31 as in the third preferred embodiment. After the signal level is read, the sample/hold switch SWsh is in the OFF state.

Once the second read from the unit pixel 3 of the arbitrary pixel row to the vertical signal line 13 is stable, the timing control unit 20 supplies control data of ramp wave generation to the reference signal generation unit 16. Upon receipt of the control data, the reference signal generation unit 16 outputs a ramp wave (reference signal Ramp). The comparison unit 31 compares the voltage of the second input terminal to which the ramp wave has been given from the reference signal generation unit 16 to the voltage of the first input terminal to which the difference signal level has been given.

In the sixth preferred embodiment of the present invention, as in the first preferred embodiment, even when slight variation remains in the voltages of the two input terminals of the differential amplifier constituting the comparison unit 31 after the reset operation of the comparison unit 31, the voltage of the first input terminal IN1 at the initiation of comparison in the comparison unit 31 is lower than the voltage of the second input terminal IN2 to which the reference signal Ramp is given. Thus, it is possible to reliably invert the output of the comparison unit 31 during the comparison operation and ensure the comparison operation by the comparison unit 31.

The comparison unit 31 compares the voltage of the second input terminal to which the ramp wave has been given from the reference signal generation unit 16 to the voltage of the first input terminal to which the difference signal level has been given, and inverts a comparison output when the two voltages are substantially the same. The measurement unit 32 starts measurement in the count-up mode based on the comparison start by the comparison unit 31, and retains a measurement value when the comparison output of the comparison unit 31 has been inverted. That is, the measurement unit 32 retains digital data corresponding to a signal component obtained by subtracting the reset level from the signal level (CDS processing). The timing control unit 20 stops a supply of control data to the reference signal generation unit 16 and an output of the reference clock when a predetermined period has elapsed. Thereby, the reference signal generation unit 16 stops the ramp wave generation. Because the measurement unit 32 performs measurement in the count-up mode during the second read, a measurement value related to Equation (8) is obtained as a measurement value of the measurement unit 32.

In the sixth preferred embodiment of the present invention, it is possible to obtain digital data in one AD conversion operation. Although digital data in which offset components (the first and second terms of the right side of Equation (8)) overlap a signal component (the third term of the right side of Equation (8)) is obtained by reducing and changing the voltage of the first input terminal to which the reset level has been given to a predetermined voltage, the offset components can be suppressed by calculating the digital data of the offset components using data of a light-blocking pixel or a dummy pixel provided in the image pickup unit 2 and subtracting the digital data of the offset components from a measurement value of the measurement unit 32.

In addition, it is possible to solve the problems occurring in the above-described (1) and (3) by changing the voltage of the first input terminal IN1 to which the pixel signal Pixel is given to a lower voltage without changing the voltage of the second input terminal IN2 to which the reference signal Ramp is given to a higher voltage. Further, it is possible to solve the problem occurring in the above-described (2) by giving predetermined voltage variation via the capacitive element C3 to change the voltage of the input terminal of the differential amplifier.

Seventh Preferred Embodiment

Figure 13:
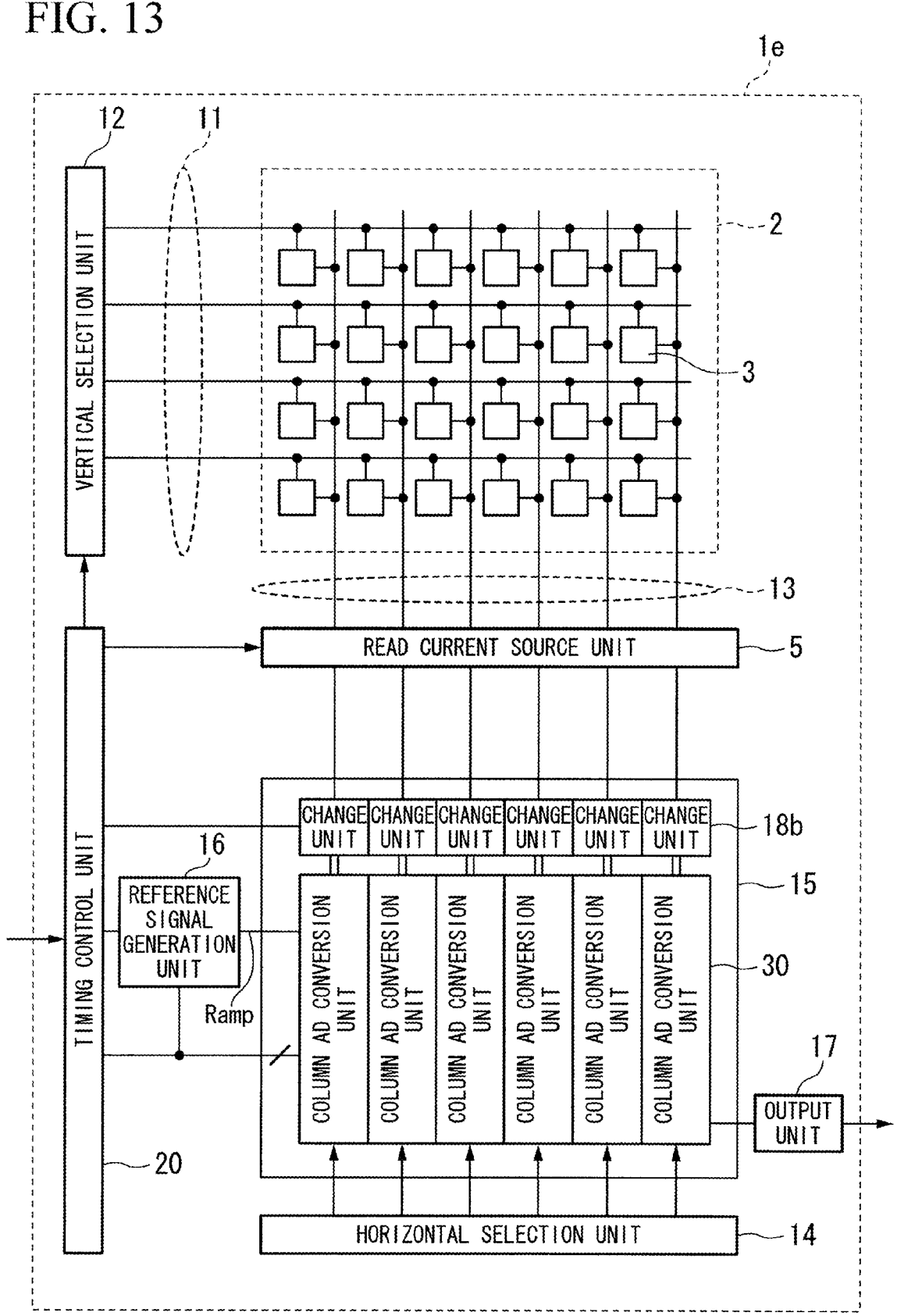
FIG. 13 is a block diagram illustrating a configuration of an image pickup device in accordance with a seventh preferred embodiment of the present invention.

Next, the seventh preferred embodiment of the present invention will be described. FIG. 13 is a block diagram illustrating an example of a (C)MOS image pickup device in accordance with the seventh preferred embodiment of the present invention. Hereinafter, a configuration of the seventh preferred embodiment of the present invention will be described. Among configurations of an image pickup device 1*e* shown in FIG. 13, connections between change units 18*b* and other parts are different from those of FIG. 8. An element itself constituting the change unit 18*b* is the same as that of the change unit 18*a* of FIG. 8. Because other configurations are substantially the same as those shown in FIG. 8, a description thereof is omitted here.

Hereinafter, parts different from the fourth preferred embodiment among operations of the seventh preferred embodiment of the present invention will be mainly described. As in the first preferred embodiment, a reset level and a signal level are output by the unit pixel 3.

AD conversion is performed as follows. For example, a ramp wave (reference signal Ramp) falling at a predetermined tilt is compared to a voltage of a reset level or a signal level as a pixel signal from the unit pixel 3. A period until a signal corresponding to the difference signal level is the same as the ramp wave (ramp voltage) from a point in time when a ramp wave for use in comparison processing has been generated is measured, for example, according to a reference clock, so that digital data corresponding to the magnitude of the reset level or the signal level is obtained.

Here, a reset level in a first read operation is read as an analog pixel signal from each unit pixel 3 of a selected row of the image pickup unit 2, and then a signal level is read in a second read operation. The reset level and the signal level are input to the column AD conversion unit 30 through the vertical signal line 13 in time series.

First Read

Once the first read from the unit pixel 3 of an arbitrary pixel row to the vertical signal line 13 is stable, a reset operation of the comparison unit 31 is performed. Subsequently, the change unit 18*b* changes a voltage of the first input terminal of the comparison unit 31 to which the reset level has been given to a predetermined voltage lower than the reset level. Details of a change operation by the change unit 18*b* will be described later. Thereafter, the timing control unit 20 supplies control data of ramp wave generation to the reference signal generation unit 16. Upon receipt of the control data, the reference signal generation unit 16 outputs a ramp wave (reference signal Ramp). The comparison unit 31 compares the voltage of the second input terminal to which the ramp wave has been given from the reference signal generation unit 16 to the voltage of the first input terminal to which the reset level has been given, and inverts a comparison output when the two voltages are substantially the same.

The measurement unit 32 starts measurement in the count-down mode based on the comparison start by the comparison unit 31, and retains a measurement value when the comparison output of the comparison unit 31 has been inverted. That is, the measurement unit 32 retains digital data corresponding to the reset level. The timing control unit 20 stops a supply of control data to the reference signal generation unit 16 and an output of the reference clock when a predetermined period has elapsed. Thereby, the reference signal generation unit 16 stops the ramp wave generation.

Second Read

Subsequently, during the second read, a signal level corresponding to an amount of incident light of each unit pixel 3 is read. During the second read, the reset operation of the comparison unit 31 and the change operation by the change unit 18*b* are not performed.

Once the second read from the unit pixel 3 of the arbitrary pixel row to the vertical signal line 13 is stable, the timing control unit 20 supplies control data of ramp wave generation to the reference signal generation unit 16. Upon receipt of the control data, the reference signal generation unit 16 outputs a ramp wave (reference signal Ramp). The comparison unit 31 compares the voltage of the second input terminal to which the ramp wave has been given from the reference signal generation unit 16 to the voltage of the first input terminal to which the signal level has been given, and inverts a comparison output when the two voltages are substantially the same.

The measurement unit 32 starts measurement in the count-up mode based on the comparison start by the comparison unit 31, and retains a measurement value when the comparison output of the comparison unit 31 has been inverted. That is, the measurement unit 32 retains digital data corresponding to a signal component obtained by subtracting the reset level from the signal level (CDS processing). The timing control unit 20 stops a supply of control data to the reference signal generation unit 16 and an output of the reference clock when a predetermined period has elapsed. Thereby, the reference signal generation unit 16 stops the ramp wave generation.

Figure 14:
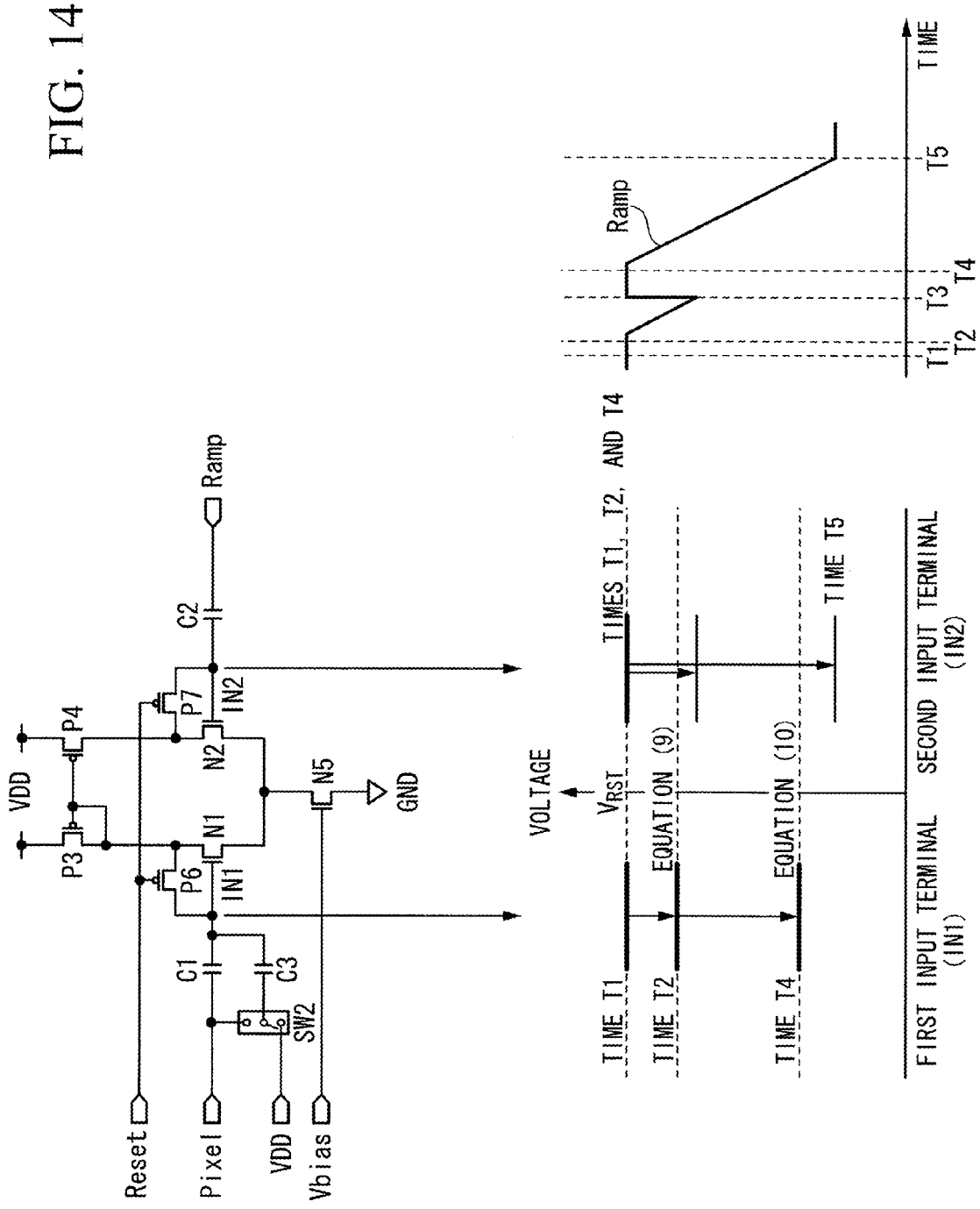
FIG. 14 is a diagram illustrating specific circuit configurations of a comparison unit and a change unit and voltage variations in input terminals of the comparison unit included the image pickup device in accordance with the seventh preferred embodiment of the present invention.
Figure 15:
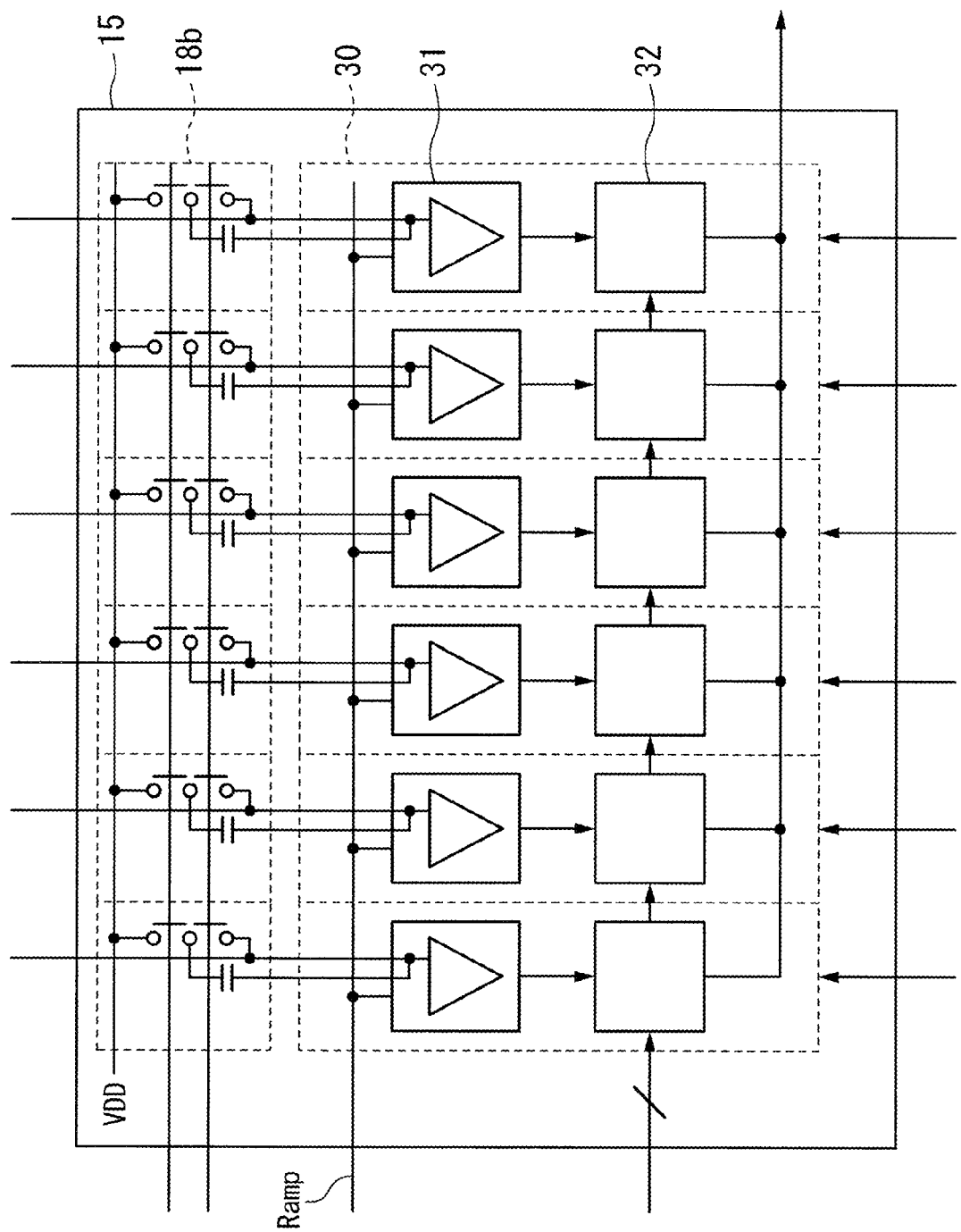
FIG. 15 is a block diagram illustrating a configuration of a column processing unit included the image pickup device in accordance with the seventh preferred embodiment of the present invention.

Next, details of configurations of the comparison unit 31 and the change unit 18b and voltage variations in the input terminals of the comparison unit 31 will be described. FIG. 14 is a diagram illustrating an example of specific circuit configurations of the comparison unit 31 and the change unit 18b and the voltage variations in the input terminals of the comparison unit. FIG. 15 is a block diagram illustrating an example of a circuit configuration of a column processing unit 15 including the comparison unit 31 and the change unit 18b. Hereinafter, a circuit configuration of the seventh preferred embodiment of the present invention will be described. Hereinafter, only configurations different from those shown in FIGS. 8 and 9 will be described.

Like the above-described change unit 18a, the change unit 18b includes a switch element SW2 and a capacitive element C3 provided in each column. However, a connection in the switch element SW2 is different from that of the change unit 18a. A first terminal of the switch element SW2 is connected to the other end of the capacitive element C3. A second terminal of the switch element SW2 is connected to the other end of the capacitive element C1 to which the pixel signal Pixel is input, and a third terminal of the switch element SW2 is connected to a power supply VDD. The power supply VDD connected to the third terminal of the switch element SW2 may be a ground GND. The switch element SW2 switches a state in which the other end of the capacitive element C1 is connected to the other end of the capacitive element C3 by short-circuiting the first terminal and the second terminal and a state in which the power supply VDD is connected to the other end of the capacitive element C3 by short-circuiting the first terminal and the third terminal. Hereinafter, an operation of the seventh preferred embodiment of the present invention will be described. Here, a voltage of a power supply VDD is $V_{DD}$, a reset-level voltage is $V_R$ ($V_R<V_{DD}$), a signal-level voltage is $V_S$ ($V_S \leq V_R$), a capacitance value of the capacitive element C1 is $C_1$, and a capacitance value of the capacitive element C3 is $C_3$. In FIG. 14, voltage variations of the first input terminal IN1 and the second input terminal IN2 of the differential amplifier within the comparison unit 31 and a waveform of the reference signal Ramp are shown.

Once the reset level 3 is given to the first input terminal IN1 as the pixel signal Pixel from the unit pixel and the reference signal Ramp given from the reference signal generation unit 16 to the second input terminal IN2 is stable, the voltages of the two input terminals are reset. At this time, the voltages of the two input terminals of the differential amplifier are reset to be substantially the same voltage $V_{RST}$. At this time (time T1), the voltage of the first input terminal IN1 is $V_{RST}$ and the voltage of the second input terminal IN2 is $V_{RST}$. During the reset operation, the other end of the capacitive element C3 is connected to the power supply VDD by the switch element SW2. After the reset, the transistors P6 and P7 are in the OFF state.

Subsequently, the switch element SW2 connects the other end of the capacitive element C3 to the other end of the capacitive element C1, so that the voltage of the first input terminal IN1 to which the pixel signal Pixel is given, that is, the gate voltage of the transistor N1, is reduced and changed from the voltage $V_{RST}$ to a predetermined voltage. Because the voltage of the other end of the capacitive element C3 is varied from $V_{DD}$ to $V_R$ by ($V_R-V_{DD}$), the voltage VIN1 of the first input terminal IN1 is defined as in the following Equation (9) at this time (time T2).

$$VIN1 = V_{RST} + \frac{C_3}{C_1+C_3} \times (V_R - V_{DD}) \quad (9)$$

Even when slight variation remains in the voltages of the two input terminals of the differential amplifier constituting the comparison unit 31 after the reset operation of the comparison unit 31, $V_R<V_{DD}$, so that the voltage of the first input terminal IN1 at the initiation of comparison by the comparison unit 31 related to the first read is lower than the voltage of the second input terminal IN2 to which the reference signal Ramp is given. As shown in FIG. 14, the ramp wave, which decreases with the passage of time, is given as the reference signal Ramp, so that the output of the comparison unit 31 can be reliably inverted during the comparison operation and the comparison operation by the comparison unit 31 can be ensured.

After time T2, the ramp wave is given to the second input terminal as the reference signal Ramp. At the timing when the voltage of the second input terminal to which the ramp wave has been given and the reset voltage of the first input terminal are substantially the same, the comparison output of the comparison unit 31 is inverted. At a time (time T3) when a predetermined time has elapsed after the input of the ramp wave to the second input terminal has been initiated, the reference signal generation unit 16 stops the ramp wave generation.

Subsequently, the signal level is given to the first input terminal IN1 as the pixel signal Pixel from the unit pixel 3. At a time (time T2) when the other end of the capacitive element C3 is connected to the other end of the capacitive element C1 by the switch element SW2, the voltage of the other end of the capacitive element C1 to which the reset level is given as the pixel signal Pixel is $V_R$. In addition, the voltage of the other end of the capacitive element C1 is $V_S$ at a time (time T4) when the signal level is input as the pixel signal Pixel. Because the voltage of the first input terminal IN1 at time T2 is defined as in Equation (9), the voltage VIN1 of the first input terminal IN1 at time T4 is defined as in the following Equation (10) using Equation (9).

$$VIN1 = V_{RST} + \frac{C_3}{C_1+C_3} \times (V_R - V_{DD}) + (V_S - V_R) \quad (10)$$

At time t2, when the other end of the capacitive element C3 is connected to the other end of the capacitive element C1 by the switch element SW2, the capacitive element C1 and the capacitive element C3 are connected in parallel. If the capacitive elements C1 and C3 connected in parallel are replaced with the capacitive element C1 of FIG. 3, variation ($V_S-V_R$) in the voltage of the first input terminal IN1 from time T2 to time T4 is caused by voltage variation ($V_S-V_R$) of the other end of the capacitive element C1 from time T2 to time T4 as described using FIG. 4. The variation is shown in the third term of the right side of Equation (10).

Because $V_R<V_{DD}$ and $V_S<V_R$, the voltage of the first input terminal IN1 at the initiation of comparison of the comparison unit 31 related to the second read is lower than the voltage of the second input terminal IN2 to which the reference signal Ramp is given. As shown in FIG. 14, the ramp wave, which decreases with the passage of time, is given as the reference signal Ramp, so that the output of the comparison unit 31 can be reliably inverted during the comparison operation and the comparison operation by the comparison unit 31 can be ensured.

After time T4, the ramp wave is given to the second input terminal as the reference signal Ramp. At the timing when the voltage of the second input terminal to which the ramp wave has been given and the voltage of the first input terminal are substantially the same, the comparison output of the comparison unit 31 is inverted. At a time (time T5) when a predetermined time has elapsed after the input of the ramp wave to the second input terminal has been initiated, the reference signal generation unit 16 stops the ramp wave generation. Because the measurement unit 32 performs measurement in the count-down mode during the first read and the measurement unit 32 performs measurement in the count-up mode during the second read, a measurement value related to the third term of the right side of Equation (10) is obtained as a measurement value of the measurement unit 32.

As described above, according to the seventh preferred embodiment of the present invention, the change unit 18b (the switch element SW2 and the capacitive element C3) changes the voltage of the first input terminal IN1 to a lower voltage so that a voltage difference between the first input terminal IN1 and the second input terminal IN2 becomes a voltage at which the comparison operation by the comparison unit 31 is ensured after the reset operation by the transistors P6 and P7. Accordingly, the comparison unit 31 can reliably perform the comparison operation between the reference signal Ramp and the pixel signal Pixel. Further, when $(V_S-V_R)$ coefficients of the third terms of the right sides in Equation (8) in accordance with the fourth preferred embodiment of the present invention and Equation (10) in accordance with the seventh preferred embodiment of the present invention are compared, the coefficient in Equation (8) is less than 1 and the coefficient in Equation (10) is 1. Thus, in the seventh preferred embodiment of the present invention, an AD conversion operation is possible without gain degradation due to the installation of the capacitive element.

In addition, it is possible to solve the problems occurring in the above-described (1) and (3) by changing the voltage of the first input terminal IN1 to which the pixel signal Pixel is given to a lower voltage without changing the voltage of the second input terminal IN2 to which the reference signal Ramp is given to a higher voltage. Further, it is possible to solve the problem occurring in the above-described (2) by giving predetermined voltage variation via the capacitive element C3 to change the voltage of the input terminal of the differential amplifier.

Eighth Preferred Embodiment

Figure 16:
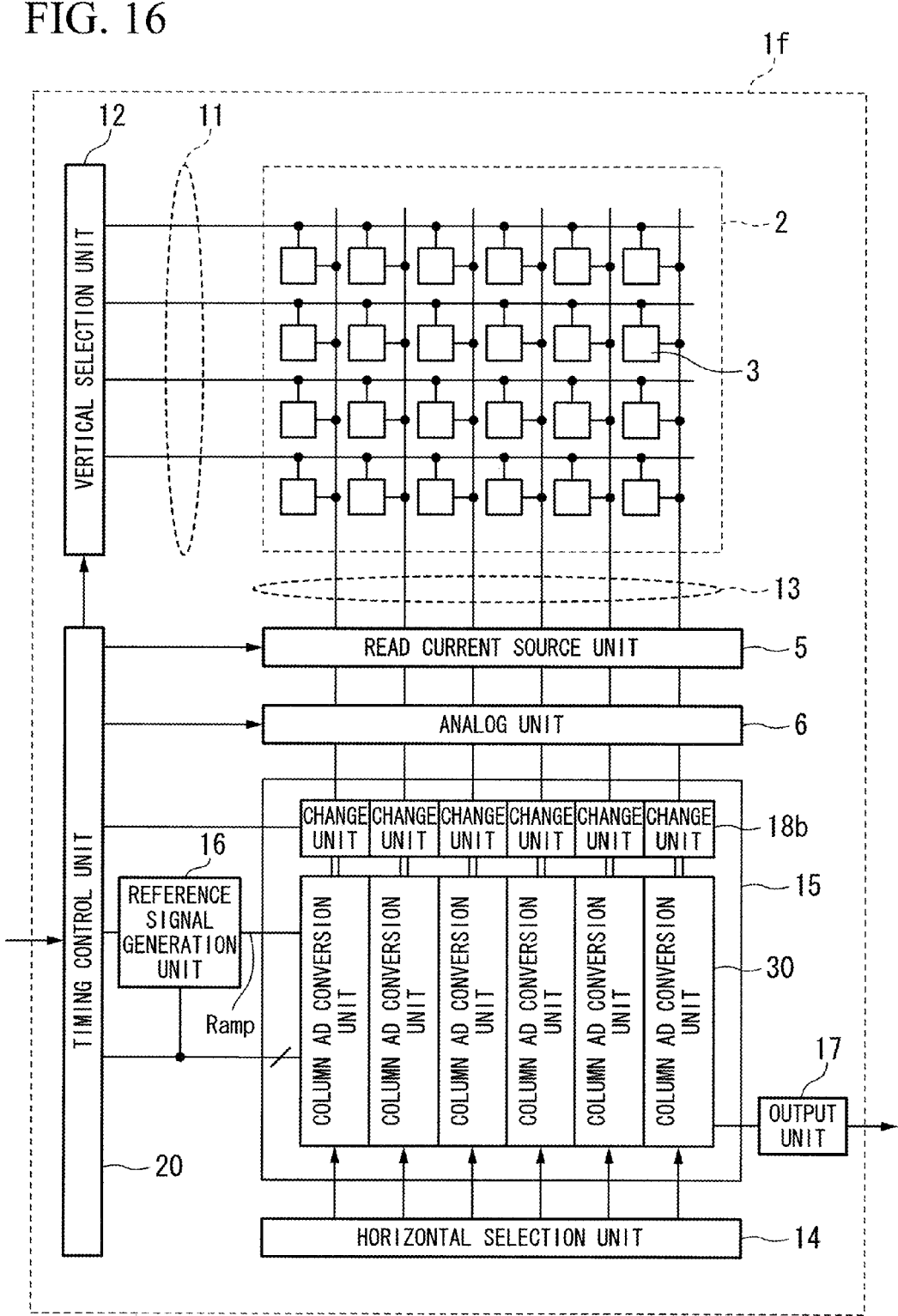
FIG. 16 is a block diagram illustrating a configuration of an image pickup device in accordance with an eighth preferred embodiment of the present invention.

Next, a eighth preferred embodiment of the present invention will be described. FIG. 16 is a block diagram illustrating an example of a configuration of a (C)MOS image pickup device in accordance with the eighth preferred embodiment of the present invention. Hereinafter, a configuration of the eighth preferred embodiment of the present invention will be described. Among configurations of an image pickup device 1f shown in FIG. 16, only an analog unit 6 is different from that of FIG. 13. The analog unit 6 of the eighth preferred embodiment of the present invention has a subtraction (CDS processing) circuit. Because configurations other than the analog unit 6 are substantially the same as those shown in FIG. 13, a description thereof is omitted here.

Next, an operation of the eighth preferred embodiment of the present invention will be described. A difference from the operation of the image apparatus 1e in accordance with the seventh preferred embodiment is an AD conversion operation based on a subtraction (CDS processing) circuit installed in the analog unit 6. Hereinafter, parts different from the seventh preferred embodiment among operations of the eighth preferred embodiment of the present invention will be mainly described. As in the first preferred embodiment, a reset level and a signal level are output by the unit pixel 3.

The AD conversion is performed as follows. For example, a ramp wave (reference signal Ramp) falling at a predetermined tilt is compared to a voltage (difference signal level) corresponding to a difference between a reset level and a signal level as a pixel signal from the unit pixel 3. A period until a signal corresponding to the difference signal level is the same as the ramp wave (ramp voltage) from a point in time when a ramp wave for use in comparison processing has been generated is measured, for example, according to a reference clock, so that digital data corresponding to a magnitude of the difference signal level is obtained.

Here, a reset level in a first read operation is read as an analog pixel signal from each unit pixel 3 of a selected row of the image pickup unit 2, and then a signal level is read in a second read operation. The reset level and the signal level are input to the analog unit 6 through the vertical signal line 13 in time series.

First Read

Once the first read from the unit pixel 3 of an arbitrary pixel row to the vertical signal line 13 is stable, the clamp switch SWclp and the sample/hold switch SWsh shown in FIG. 7 are in the ON state and the reset operation of the comparison unit 31 is performed. Subsequently, the change unit 18b changes a voltage of the first input terminal of the comparison unit 31 to which the reset level has been given to a predetermined voltage lower than the reset level. Subsequently, the clamp switch SWclp is in the OFF state.

Second Read

Subsequently, during the second read, a signal level corresponding to an amount of incident light of each unit pixel 3 is read. During the second read, the reset operation of the comparison unit 31 and the change operation by the change unit 18b are not performed. In addition, if a voltage input to the clamp capacitor Cclp is varied from the reset level to the signal level, a difference signal level $(V_S-V_R)$ between the signal level and the reset level is given to the first input terminal of the comparison unit 31 as in the third preferred embodiment. After the signal level is read, the sample/hold switch SWsh is in the OFF state.

Once the second read from the unit pixel 3 of the arbitrary pixel row to the vertical signal line 13 is stable, the timing control unit 20 supplies control data of ramp wave generation to the reference signal generation unit 16. Upon receipt of the control data, the reference signal generation unit 16 outputs a ramp wave (reference signal Ramp). The comparison unit 31 compares the voltage of the second input terminal to which the ramp wave has been given from the reference signal generation unit 16 to the voltage of the first input terminal to which the difference signal level has been given, and inverts a comparison output when the two voltages are substantially the same.

The measurement unit 32 starts measurement in the count-up mode based on the comparison start by the comparison unit 31, and retains a measurement value when the comparison output of the comparison unit 31 has been inverted. That is, the measurement unit 32 retains digital data corresponding to a signal component obtained by subtracting the reset level from the signal level (CDS processing). The timing control unit 20 stops a supply of control data to the reference signal generation unit 16 and an output of the reference clock when a predetermined period has elapsed. Thereby, the reference signal generation unit 16 stops the ramp wave generation.

Figure 17:
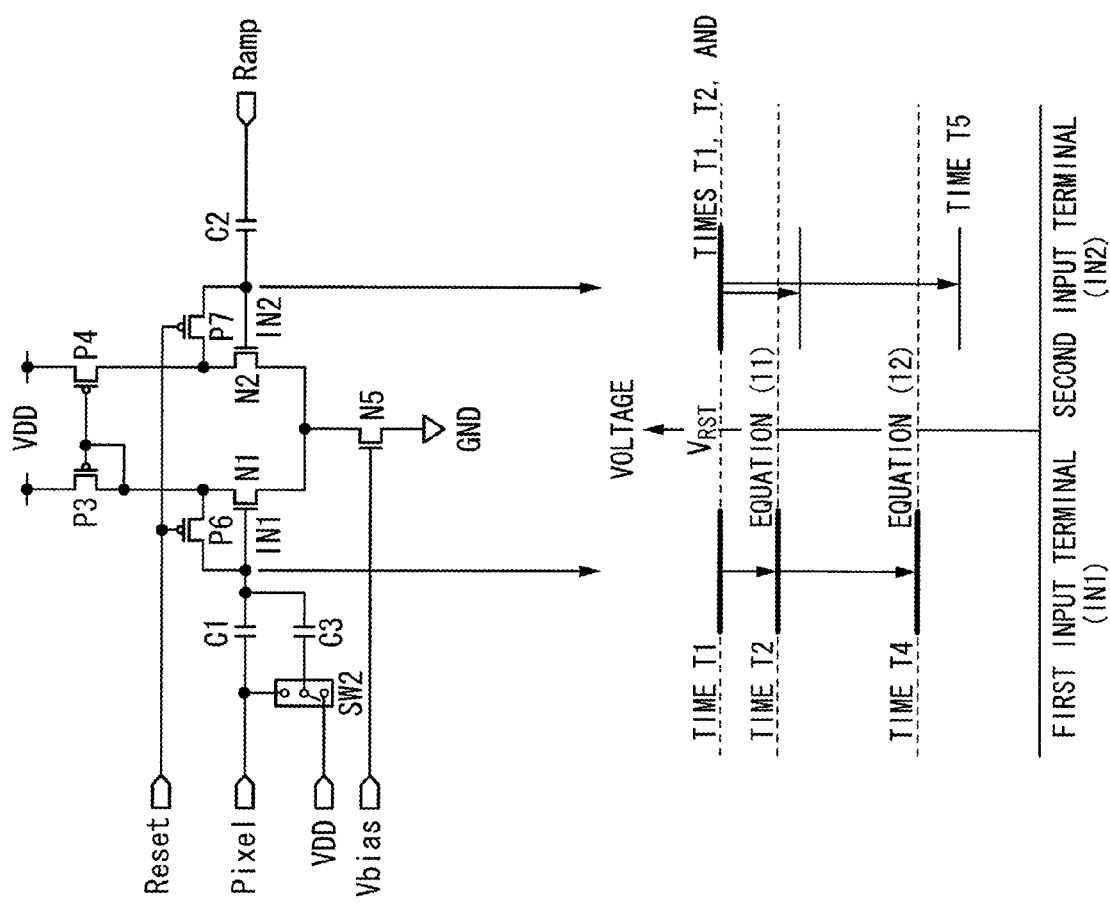
FIG. 17 is a diagram illustrating specific circuit configurations of a comparison unit and a change unit and voltage variations in input terminals of the comparison unit included the image pickup device in accordance with the eighth preferred embodiment of the present invention.
Figure 18:
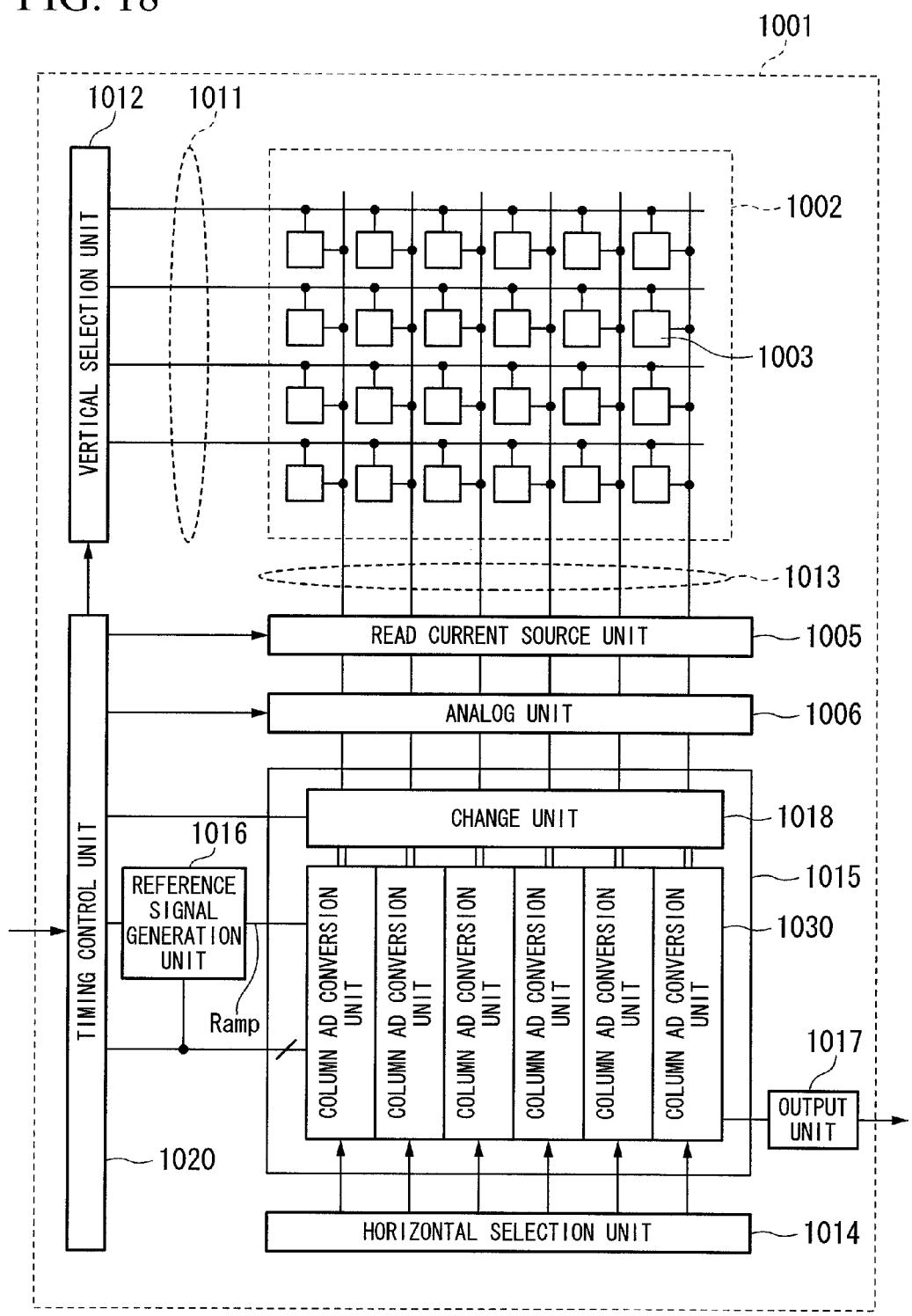
FIG. 18 is a block diagram illustrating a configuration of an image pickup device in accordance with the related art.
Figure 19:
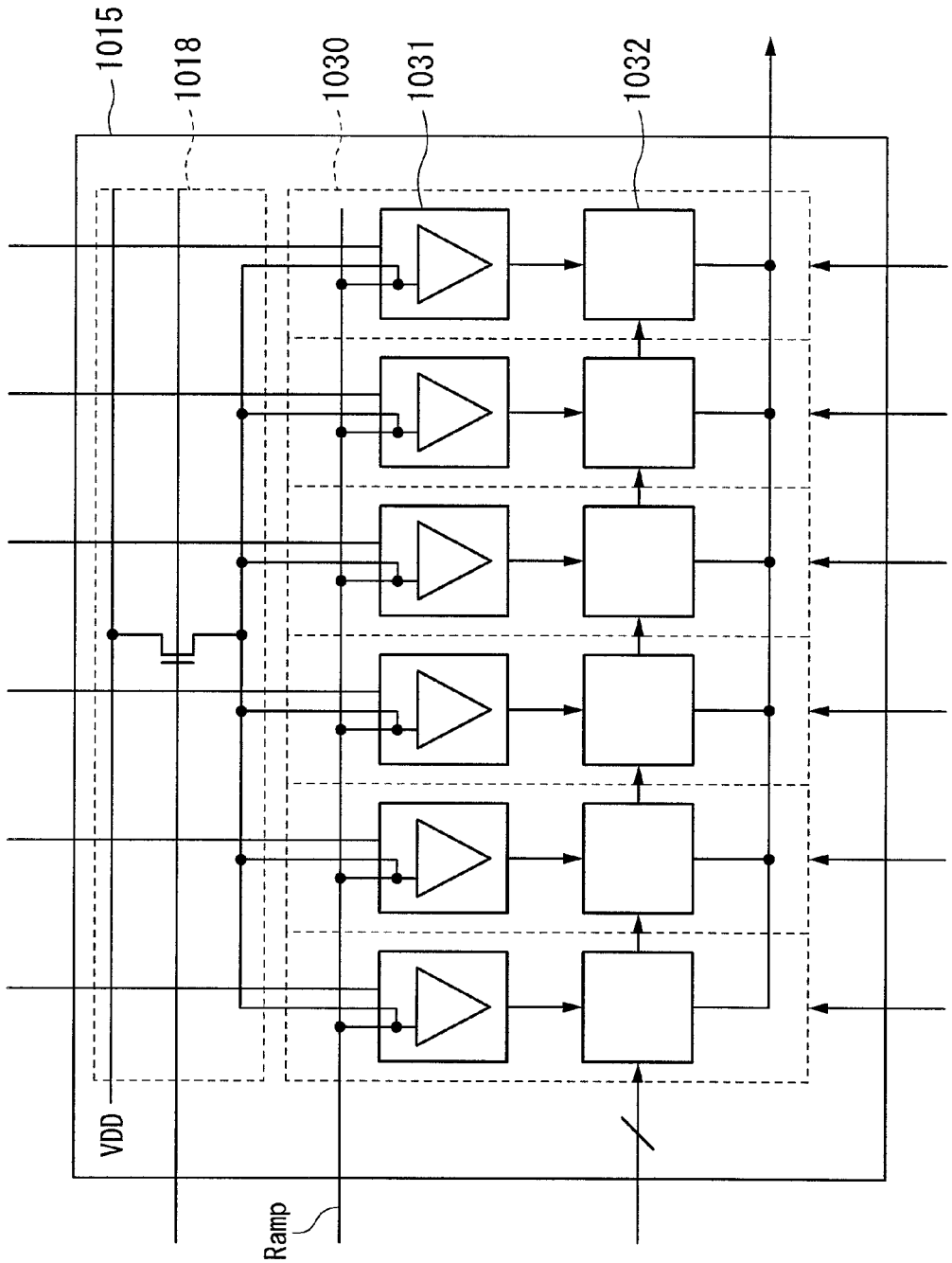
FIG. 19 is a block diagram illustrating a configuration of a column processing unit included in the image pickup device in accordance with the related art.

Next, details of voltage variations in the input terminals of the comparison unit 31 will be described. FIG. 17 is a diagram illustrating an example of a specific circuit configuration of the comparison unit 31 and the voltage variations in the input terminals of the comparison unit. Because a circuit configuration shown in FIG. 17 is substantially the same as the circuit configuration shown in FIG. 14, a description thereof is omitted here.

Hereinafter, an operation of the eighth preferred embodiment of the present invention will be described. Here, a voltage of the voltage source V1 is $V_1$, a voltage of the voltage source V2 is $V_2$ ($V_2<V_1$), a reset-level voltage is $V_R$ ($V_R<V_{DD}$ when a voltage of a power supply VDD is $V_{DD}$), a signal-level voltage is $V_S$ ($V_S \leq V_R$), a capacitance value of the capacitive element C1 is $C_1$, and a capacitance value of the capacitive element C3 is $C_3$. In FIG. 17, voltage variations of the first input terminal IN1 and the second input terminal IN2 of the differential amplifier within the comparison unit 31 and a waveform of the reference signal Ramp are shown.

Once the reset level is given to the first input terminal IN1 as the pixel signal Pixel from the unit pixel 3 and the reference signal Ramp given from the reference signal generation unit 16 to the second input terminal IN2 is stable, the voltages of the two input terminals are reset. At this time, the voltages of the two input terminals of the differential amplifier are reset to be substantially the same voltage $V_{RST}$. At this time (time T1), the voltage of the first input terminal IN1 is $V_{RST}$ and the voltage of the second input terminal IN2 is $V_{RST}$. During the reset operation, the other end of the capacitive element C3 is connected to the power supply VDD by the switch element SW2. After the reset, the transistors P6 and P7 are in the OFF state.

Subsequently, the switch element SW2 connects the other end of the capacitive element C3 to the voltage source V2, so that the voltage of the first input terminal IN1 to which the pixel signal Pixel is given, that is, a gate voltage of the transistor N1, is reduced and changed from the voltage $V_{RST}$ to a predetermined voltage. Because the voltage of the other end of the capacitive element C3 is varied from $V_{DD}$ to $V_{clp}$ by ($V_{clp}$−VDD) if the voltage given to the other end of the capacitive element C1 is $V_{clp}$ when the clamp switch SWclp and the sample/hold switch SWsh shown in FIG. 7 are in the ON state, the voltage VIN1 of the first input terminal IN1 is defined as in the following Equation (11) at this time (time T2).

$$VIN1 = V_{RST} + \frac{C_3}{C_1 + C_3} \times (V_{clp} - V_{DD}) \qquad (11)$$

Subsequently, the signal level is given to the first input terminal IN1 as the pixel signal Pixel from the unit pixel 3. The voltage VIN1 of the first input terminal IN1 at a time (time T4) when the signal level has been input becomes the following Equation (12).

$$VIN1 = V_{RST} + \frac{C_3}{C_1 + C_3} \times (V_{clp} - V_{DD}) + (V_S - V_R) \qquad (12)$$

Because $V_{clp}<V_{DD}$ and $V_S<V_R$, the voltage of the first input terminal IN1 at the initiation of comparison in the comparison unit 31 related to the second read is lower than the voltage of the second input terminal IN2 to which the reference signal Ramp is given. The ramp wave, which decreases with the passage of time, is given as the reference signal Ramp as shown in FIG. 17, so that the output of the comparison unit 31 can be reliably inverted during the comparison operation and the comparison operation by the comparison unit 31 can be ensured.

After time T4, the ramp wave is given to the second input terminal as the reference signal Ramp. At the timing when the voltage of the second input terminal to which the ramp wave has been given and the voltage of the first input terminal are substantially the same, the comparison output of the comparison unit 31 is inverted. At a time (time T5) when a predetermined time has elapsed after the input of the ramp wave to the second input terminal has been initiated, the reference signal generation unit 16 stops the ramp wave generation. Because the measurement unit 32 performs measurement in the count-up mode during the second read, a measurement value related to Equation (12) is obtained as a measurement value of the measurement unit 32.

In the eighth preferred embodiment of the present invention, it is possible to obtain digital data in one AD conversion operation. Although digital data in which offset components (the first and second terms of the right side of Equation (12)) overlap a signal component (the third term of the right side of Equation (12)) is obtained by reducing and changing the voltage of the first input terminal to which the reset level has been given to a predetermined voltage, the offset components can be suppressed by calculating the digital data of the offset components using data of a light-blocking pixel or a dummy pixel provided in the image pickup unit 2 and subtracting the digital data of the offset components from a measurement value of the measurement unit 32.

In addition, it is possible to solve the problems occurring in the above-described (1) and (3) by changing the voltage of the first input terminal IN1 to which the pixel signal Pixel is given to a lower voltage without changing the voltage of the second input terminal IN2 to which the reference signal Ramp is given to a higher voltage. Further, it is possible to solve the problem occurring in the above-described (2) by giving predetermined voltage variation via the capacitive element C3 to change the voltage of the input terminal of the differential amplifier.

While preferred embodiments of the present invention have been described and illustrated above, it should be understood that these are examples of the present invention and are not to be considered as limiting. Additions, omissions, substitutions, and other modifications can be made without departing from the scope of the present invention.

Although, in the above-described preferred embodiments, a change unit of each preferred embodiment described above changes a voltage of the first input terminal IN1 of the comparison unit 31 to a lower voltage, the voltage may be changed as follows. That is, when the voltage of the signal level read in the second read is higher than that of the reset level read in the first read and the waveform of the ramp wave input to the comparison unit 31 as the reference signal Ramp increases with the passage of time, the change unit changes the voltage of the first input terminal IN1 of the comparison unit 31 to a higher voltage.

Accordingly, the invention is not to be considered as being limited by the foregoing description, and is only limited by the scope of the claims.

What is claimed is:

1. An image pickup device comprising:
   an image pickup unit in which unit pixels having photoelectric conversion elements are arranged, the unit pixels outputting pixel signals;

a reference signal generation unit that generates a reference signal, the reference signal being increased or decreased with a passage of time;

a comparison unit that includes a differential amplifier unit and a reset unit, the differential amplifier unit having a first input terminal and a second input terminal, the first input terminal being electrically connected to the unit pixel via a first capacitive element, the second input terminal being electrically connected to the reference signal generation unit, the differential amplifier unit comparing a voltage of the first input terminal to a voltage of the second input terminal, the reset unit resetting the voltages of the first and second input terminals;

a measurement unit that measures a comparison time of the comparison unit from a comparison start to a comparison end; and a change unit that changes the voltage of the first input terminal so that a voltage difference between the first input terminal and the second input terminal is set to a voltage at which a comparison operation by the comparison unit is ensured after a reset operation by the reset unit, wherein the change unit comprises a second capacitive element and a second switch element, one end of the second capacitive element is connected to the first input terminal, and the other end of the second capacitive element is connected to a first voltage source by the second switch element during the reset operation by the reset unit, and connected to a second voltage source different from the first voltage source after the reset operation by the reset unit.

2. The image pickup device according to claim 1, wherein the first voltage source is a power supply or a ground, and the second voltage source is the pixel signal.

* * * * *